(12) United States Patent
Itagaki

(10) Patent No.: US 7,880,931 B2
(45) Date of Patent: Feb. 1, 2011

(54) IMAGE PROCESSING APPARATUS AND ITS METHOD, AND CONTROL METHOD

(75) Inventor: Tomohisa Itagaki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/481,416

(22) Filed: Jun. 9, 2009

(65) Prior Publication Data

US 2009/0244557 A1  Oct. 1, 2009

Related U.S. Application Data

(62) Division of application No. 11/924,172, filed on Oct. 25, 2007, now Pat. No. 7,554,694, which is a division of application No. 10/603,595, filed on Jun. 26, 2003, now Pat. No. 7,369,271.

(30) Foreign Application Priority Data

Jun. 28, 2002 (JP) ............... 2002-190540
Jun. 28, 2002 (JP) ............... 2002-190541

(51) Int. Cl.
*H04N 1/00* (2006.01)
*G06K 15/02* (2006.01)

(52) U.S. Cl. ............ 358/1.9; 358/523; 358/524; 399/45; 347/139

(58) Field of Classification Search .......... 358/1.1, 358/1.6, 1.9, 1.13, 1.15, 518, 520, 523, 524; 382/162, 167; 347/139, 155, 262, 264; 399/45, 399/68
See application file for complete search history.

(56) References Cited

U.S. PATENT DOCUMENTS

| | | | |
|---|---|---|---|
| 5,467,434 A | 11/1995 | Hower et al. | |
| 5,646,752 A | 7/1997 | Kohler et al. | |
| 5,689,760 A | 11/1997 | Suzuki et al. | |
| 5,852,462 A * | 12/1998 | Lloyd et al. | 399/45 |
| 6,044,173 A | 3/2000 | Kumada | |
| 6,079,807 A | 6/2000 | Lindstrom et al. | |
| 6,124,944 A | 9/2000 | Ohta | |
| 6,351,320 B1 | 2/2002 | Shin | |
| 6,452,692 B1 | 9/2002 | Yacoub | |
| 6,525,721 B1 | 2/2003 | Thomas et al. | |
| 6,561,643 B1 * | 5/2003 | Walker et al. | 347/105 |
| 6,563,944 B1 | 5/2003 | Kumada | |
| 6,947,174 B1 | 9/2005 | Chen et al. | |
| 6,955,486 B2 | 10/2005 | Nishitani | |
| 6,972,865 B1 | 12/2005 | Muramatsu | |
| 7,042,585 B1 | 5/2006 | Whitmarsh et al. | |

(Continued)

FOREIGN PATENT DOCUMENTS

JP    2-132481    5/1990

(Continued)

*Primary Examiner*—Kimberly A Williams
(74) *Attorney, Agent, or Firm*—Fitzpatrick, Cella, Harper & Scinto

(57) ABSTRACT

An ICC profile includes brief gloss information indicating glossy/matte attribute as attribute information, however, gloss matching cannot be performed with the 2 options. In a case where embedding of glossiness information into the ICC profile is designated, glossiness information is obtained from a color chart placed on an original plate of a color copier, and the obtained glossiness information is described in a private tag of the ICC profile.

12 Claims, 24 Drawing Sheets

U.S. PATENT DOCUMENTS

| | | |
|---|---|---|
| 7,095,529 B2 | 8/2006 | Krueger et al. |
| 7,134,797 B2 | 11/2006 | Nishitani |
| 7,227,659 B2 | 6/2007 | Nakata et al. |
| 7,280,260 B2 | 10/2007 | Hagai |
| 7,369,271 B2 | 5/2008 | Itagaki |
| 2002/0080388 A1 | 6/2002 | Chrisop et al. |
| 2002/0109856 A1 | 8/2002 | Sasanuma et al. |
| 2003/0072043 A1 | 4/2003 | Hagai et al. |
| 2003/0123075 A1 | 7/2003 | Lin et al. |
| 2003/0218656 A1 | 11/2003 | Yamazaki et al. |
| 2004/0004731 A1 | 1/2004 | Itagaki |
| 2005/0030334 A1 | 2/2005 | Kai et al. |
| 2005/0047649 A1* | 3/2005 | Jacob .................. 358/1.9 |
| 2005/0122368 A1 | 6/2005 | Yamazaki et al. |
| 2005/0141008 A1 | 6/2005 | Billow et al. |
| 2005/0195417 A1 | 9/2005 | Shimada |
| 2006/0187505 A1 | 8/2006 | Ng et al. |
| 2007/0127058 A1 | 6/2007 | Eldridge |
| 2007/0185979 A1 | 8/2007 | Yoshida |
| 2007/0211097 A1 | 9/2007 | Yamazaki et al. |

FOREIGN PATENT DOCUMENTS

| | | |
|---|---|---|
| JP | 7-154623 | 6/1995 |
| JP | 7-191510 | 7/1995 |
| JP | 7-234610 | 9/1995 |
| JP | 8-160684 | 6/1996 |
| JP | 9-114267 | 5/1997 |
| JP | 9-160315 | 6/1997 |
| JP | 9-181908 | 7/1997 |
| JP | 10-055084 | 2/1998 |
| JP | 10-055085 | 2/1998 |
| JP | 10-198093 | 7/1998 |
| JP | 11-235856 | 8/1999 |
| JP | 2000-143016 | 5/2000 |
| JP | 2001-100468 | 4/2001 |
| JP | 2001-146045 | 5/2001 |
| JP | 2001-199577 | 7/2001 |
| JP | 2002-123134 | 4/2002 |

* cited by examiner

F I G. 22

| WEIGHT OF PAPER | FIXING CONDITION |
|---|---|
| 60~120g/m² | NORMAL FIXING CONDITION |
| 121~200g/m² | REDUCE FIXING SPEED TO 1/2 |
| 201~290g/m² | REDUCE FIXING SPEED TO 1/2 |

F I G. 23

| PAPER TYPE CONDITION | | FIXING CONDITION |
|---|---|---|
| NORMAL MODE | GLOSSINESS IS LOWER THAN 30 | NORMAL FIXING CONDITION CORRESPONDING TO WEIGHT OF PAPER |
| GLOSS MODE | GLOSSINESS IS EQUAL TO OR HIGHER THAN 30 | INCREASE FIXING TEMPERATURE BY 20 °C |
| GLOSS MODE WITHOUT GLOSSY PAPER | GLOSSINESS IS LOWER THAN 30 | INCREASE FIXING TEMPERATURE BY 20 °C REDUCE FIXING SPEED DEFINED BY WEIGHT OF PAPER TO 1/2 |

# IMAGE PROCESSING APPARATUS AND ITS METHOD, AND CONTROL METHOD

RELATED APPLICATIONS

This application is a divisional application of Ser. No. 11/924,172, filed Oct. 25, 2007, which is a divisional application of Ser. No. 10/603,595, filed Jun. 26, 2003, now U.S. Pat. No. 7,369,271, and claims benefit of the filing date of those applications under 35 U.S.C. §120, and benefit under 35 U.S.C. §119 of Japanese Patent Applications 2002/190540 and 2002/190541, both filed on Jun. 28, 2002. The entire disclosures of all four mentioned prior applications are hereby incorporated herein by reference.

FIELD OF THE INVENTION

The present invention relates to an image processing apparatus and its method and a control method, and more particularly, to image processing in consideration of glossiness of an image.

BACKGROUND OF THE INVENTION

In recent days, images outputted from electrophotography-based printers and color copiers have exponentially improved image quality equivalent to the image quality in offset printing. The advance has been achieved by improvement in image formation process including charging, development transfer, fixing and cleaning and expansion of color reproduction range in toner saturation direction.

On the other hand, there is an increasing trend in use of a printer or color copier connected to a network as a multifunction printer (MFP). As images from various devices are inputted into the printer or color copier via the network, color matching between the apparatus and the images is difficult. To solve this inconvenience, various color management methods have been proposed. For example, a color management system (CMS) using an ICC (International Color Consortium) profile is becoming a de facto standard.

Further, to realize a remote proof, cluster printing and the like for outputting an image, color-coordinated by a designer, in different places, new usage of image forming apparatus, i.e., connecting plural image forming apparatuses to a network server and outputting an image, is becoming popularized.

Further, there has been proposed a calibration method for matching gradation of single color to an initial status without converting a multi-color table of an ICC profile in consideration of stability of image forming apparatus.

In these days, a user can individually generate an ICC profile for a printer and cause the printer to output an image in which color conversion has been performed by a computer device (PC). Otherwise, the user can download the generated ICC profile to the printer or a RIP (Raster Image Processor) for color matching. For these purposes, software programs and color measuring devices for generation of profile are commercially available. Accordingly, an environment for color matching to a target color is being developed for users having certain degree of knowledge.

Further, to realize a remote proof, cluster printing and the like for outputting an image, color-coordinated by a designer, in different places, new usage of image forming apparatus, i.e., connecting plural image forming apparatuses to a network server and outputting an image, is becoming popularized.

Further, color conversion processing in the image forming apparatus is LOG-converting RGB signals inputted from a scanner to CMY signals, UCR-processing the CMY signals for generating K (black) component, to CMYK signals. The color conversion between device-dependent color spaces such as conversion from RGB color space of the scanner to CMYK color space of the printer can be performed without problem in a closed image formation environment such as a copier. However, signals inputted into the MFP have various color spaces and color matching cannot be performed in the above method. Accordingly, a method employed for color conversion processing in image forming apparatuses is converting an input signal to device-independent color space (e.g., CIE Lab) utilizing the ICC profile, and further, to printer color space by using the ICC profile of the printer. The ICC profile can be easily downloaded to the image forming apparatus. To suppress color change due to degradation of durability to a minimum, a latest ICC profile is sequentially downloaded.

The ICC profile includes brief gloss information "glossy/matte" as attribute information. However, gloss matching cannot be performed with only the two options. Even to reproduce the same color, if glossiness is different, the impression of an output image is different. For the purpose of gloss matching, gloss simulation must be performed by a computer device. In the case of gloss simulation, an image forming apparatus defined by the ICC profile must be selected for image output.

Upon selection of image forming apparatus in the cluster printing, a color oriented flow is employed, however, there is no flow for simulation of glossiness matching and selection of image forming apparatus.

In this situation, an image with desired glossiness cannot be outputted if the model of image forming apparatus is different, and the impression of the output image is different.

Further, as the ICC profile includes description of information for accurately mapping color information in another device-dependent color space or device-independent color space, it is acknowledged as available for color matching. However, factors that influence the impression of an output image are not limited to colors. Particularly, glossiness is closely related to colors, and the glossiness often influences viewers' reaction to a print as being "realistic", "high-class" and the like. The ICC also recognizes the significance of glossiness, and the ICC profile includes brief gloss information "glossy/matte" as attribute information, but this information is not effectively utilized.

Further, in many cases, even when an ICC profile for glossy paper has been selected and color conversion has been performed, normal paper is selected upon output setting. Accordingly, there is desired a function of preventing such inconvenient paper selection and further a function of automatically selecting a print sheet.

SUMMARY OF THE INVENTION

The present invention has been made to solve the above-described problems individually or at once, and has its object to perform image processing in consideration of glossiness of an image.

According to the present invention, the foregoing object is attained by providing an image processing apparatus for generating a profile in which information on color conversion between device-dependent color space and device-independent color space is described, comprising: an inputting section, arranged to input glossiness information indicating glossiness of an image; and a description section, arranged to describe the input glossiness information in the profile.

Further, another object of the present invention is to control image formation in correspondence with gloss information described in a profile.

According to the present invention, the foregoing object is attained by providing an image processing apparatus for performing color conversion based on a profile in which information on color conversion between device-dependent color space and device-independent color space is described, comprising: an acquisition section, arranged to acquire glossiness information described in the profile; and a controller, arranged to control image formation based on the result of comparison between the glossiness information and a set image forming mode.

Further, another object of the present invention is to control image formation in correspondence with the gloss information described in a profile and the type of print sheet available for image formation.

According to the present invention, the foregoing object is attained by providing an image processing apparatus for performing color conversion based on a profile in which information on color conversion between device-dependent color space and device-independent color space is described, comprising: an acquisition section, arranged to acquire glossiness information described in the profile; a detector, arranged to detect the type of a print medium available for image formation; and a controller, arranged to determine a print medium and an image forming mode to be used in the image formation based on the glossiness information and the type of the print medium, and control the image formation.

Further, another object of the present invention is to store a profile with accurate description.

According to the present invention, the foregoing object is attained by providing an image processing apparatus for performing color conversion based on a profile in which information on color conversion between device-dependent color space and device-independent color space is described, comprising:

a memory, arranged to hold the profile; and a controller, arranged to determine a description of gloss condition of the profile to be stored in the memory, and controls storage of the profile based on the result of determination.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 22 is a table showing fixing conditions corresponding to weight of paper;

FIG. 23 is a table showing fixing controls corresponding to modes; and

DETAILED DESCRIPTION OF THE PREFERRED EMBODIMENTS

Hereinbelow, image processing according to an embodiment of the present invention will be described in detail in accordance with the accompanying drawings.

At present, various processings in consideration of color reproducibility are proposed. A description will be made about processing using an ICC profile that has become commercially popular in recent years.

An ICC profile is used for converting color image data defined in correspondence with color space of one device into color image data defined in correspondence with another device-dependent color space or device-independent color space PCS (Profile Connection Space). For example, in the ICC profile, a series of standard color conversion operations are defined for converting image data in RGB color space to PCS image data and further to image data in CMYK color space of color printer.

Note that as described above, the gloss information included in the public tag of the ICC profile merely indicates "glossy/matte" attribute, and it is difficult to perform gloss matching. Accordingly, in the present embodiment, gloss information is added to the private tag, and gloss matching is performed in correspondence with circumstance.

[Configuration]

Figure 1:
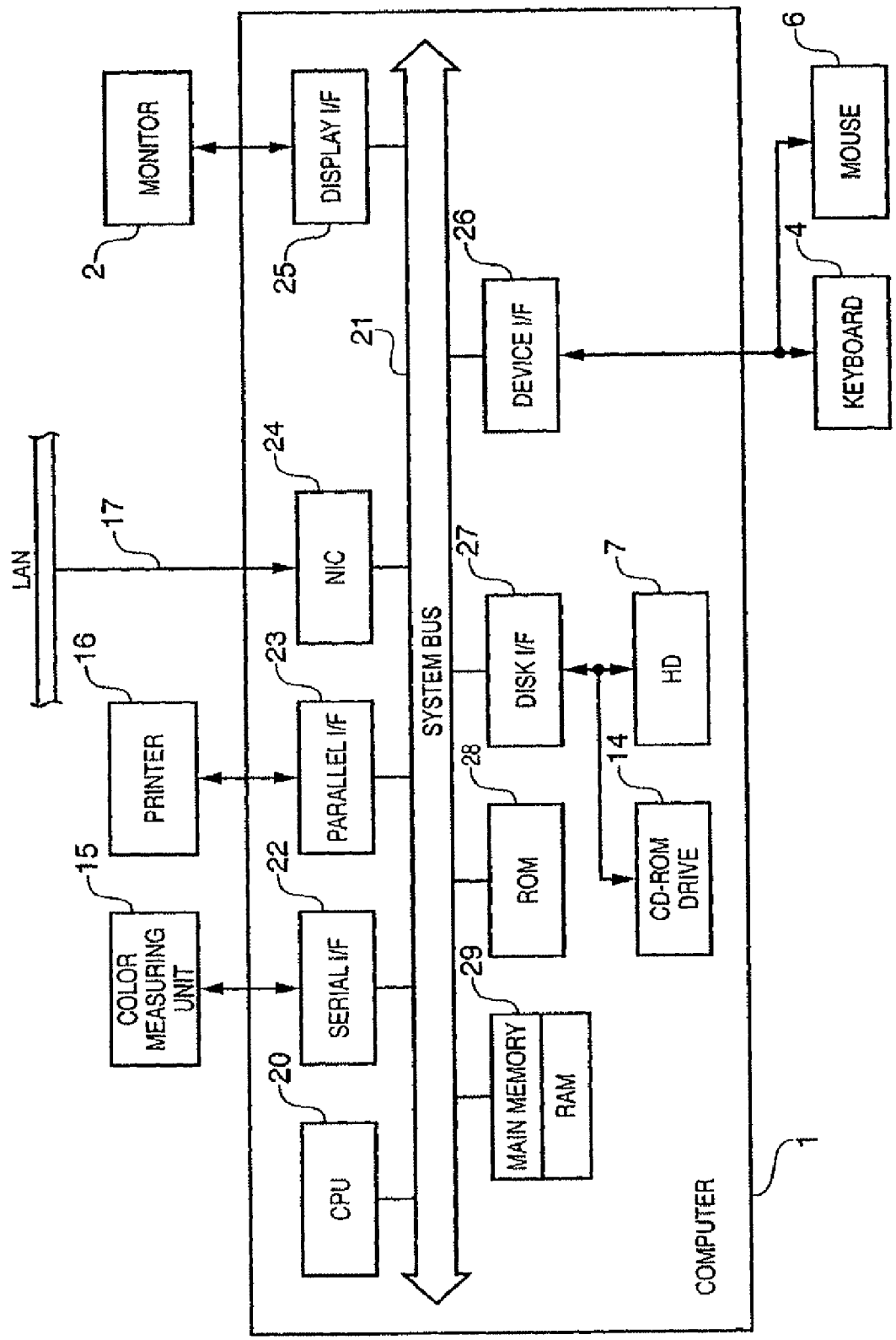
FIG. 1 is a block diagram showing the configuration of a system to perform image processing.

FIG. 1 is a block diagram showing the configuration of a system to perform image processing according to the embodiment of the present invention.

A general computer 1 such as a personal computer controls respective elements connected to a system bus 21 and performs processing to be described later, with a main memory 29 such as a RAM as a work area, based on a program stored in a ROM 28 or a hard disk (HD) 7.

The system bus 21 is connected to the following interfaces. A serial interface (I/F) 22 is connected to a color measuring unit 15 which measures colors of a color image and inputs the result of color measurement into the computer 1. A parallel I/F 23 is connected to a color copier (or printer) 16 which prints a color image on a print medium based on image data outputted from the computer 1. A display I/F 25 is connected to a monitor 2. A device I/F 26 is connected to a keyboard 4 which inputs a character code and a command, and to a pointing device 6 such as a mouse to specify and operate an object displayed on the monitor 2. A disk I/F 27 is connected to the HD 7 and a CD-ROM drive 14 for a storage medium such as a CD-ROM. Further, a network interface card (NIC) 24 is used for connection via a network cable 17 to a network such as a LAN.

Note that a serial interface such as RS232C and RS422 or a serial bus such as USB (Universal Serial Bus) or IEEE 1394 is used as the serial I/F 22 and the device I/F 26, Further, IEEE 1284, SCSI or GPIB interface is used as the parallel I/F 23. A parallel interface such as ATA (ATAPI) or SCSI or a serial bus such as USB, IEEE 1394 of Serial ATA is used as the disk I/F 27. Note that the color measuring unit 15 and the printer 16 may be connected to the device I/F 26.

Figure 2:
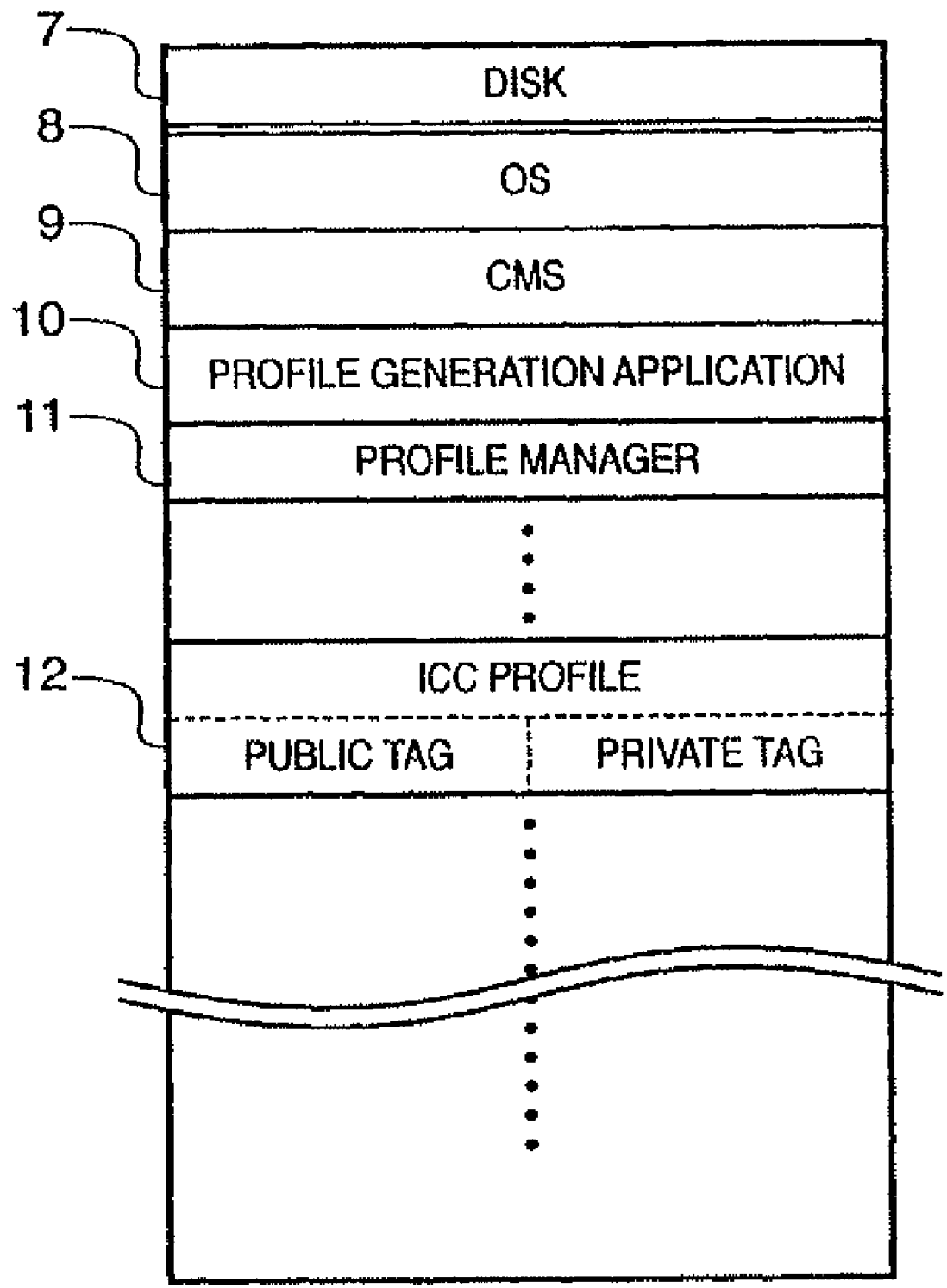
FIG. 2 is a table explaining software and data stored in a HD.

FIG. 2 is a table explaining software and data stored in the HD 7. An operating system (OS) 8, a color management system (CMS) 9 including a CMM (Color Matching Module), an application 10 for generation (change) of ICC profile or the like, a profile manager 11 for storage of private tag, and ICC profile 12, and the like, are stored in the HD 7. The computer 1 reads these programs and data from a storage medium such as a CD-ROM, and stores them on the hard disk 7.

Further, the color copier 16, having a function of reading glossiness of a print medium, inputs read information indicating glossiness into the computer 1.

Note that the computer shown in FIG. 1 is not limited to a general computer but a specialized computer or data processing apparatus may be used.

[CMS and ICC Profile]

The CMM included in the CMS 9 refers to a description in the ICC profile 12 and performs color conversion. For example, the CMM converts image data in RGB color space to data in another color space such as CMYK by using data stored in the ICC profile. In other words, the ICC profile is used for conversion from image data generated by a device to image data in another device-dependent color space. For example, RGB image data for a monitor can be converted to CMYK image data for a printer.

Figure 3:
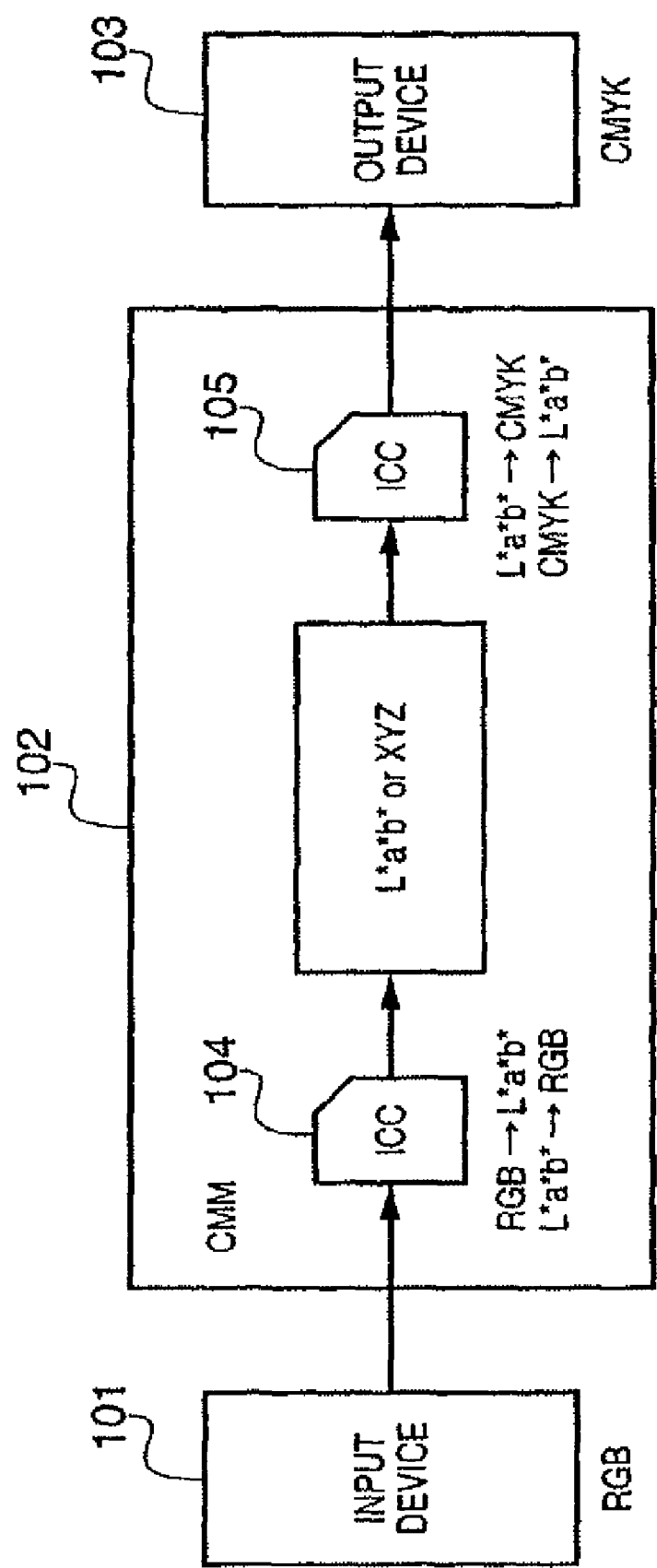
FIG. 3 is a block diagram explaining color conversion.

The ICC profile, prepared for each device, provides color conversion information regarding the device to the CMM. FIG. 3 is a block diagram explaining color conversion. The CMM 102 refers to an ICC profile 104 of an input device 101, converts RGB image data in color space depending on the input device to Lab (or XYZ) data in device-independent color space (PCS), performs color space compression (gamut mapping) in accordance with necessity, further, refers to an ICC profile 105 of an output device 103, and converts the Lab data to CMYK data in color space depending on the output device 103. The color conversion in a reverse manner can be performed. In this manner, the CMM uses the ICC profiles for color conversion between color spaces depending on two devices.

Note that FIG. 3 shows the ICC profile 104 corresponding to the input device 101 such as a scanner and 105 corresponding to the output device 103 such as a printer, however, the ICC profiles are not installed in these devices. The ICC profiles may be embedded in data (image data such as TIFF) to be color-converted by the CMM or may be stored in the memory of the computer 1 to perform the CMM. Further, the ICC profile can be applied to an image input/output device such as a digital camera, a monitor and a color facsimile apparatus as well as the scanner and the printer.

In the PCS, CIE Lab or XYZ chromaticity coordinates are defined with D50 standard light source in uniform color space, and as a color measurement condition, 0/45 or 45/0 reflectivity measurement is defined.

Figure 4:
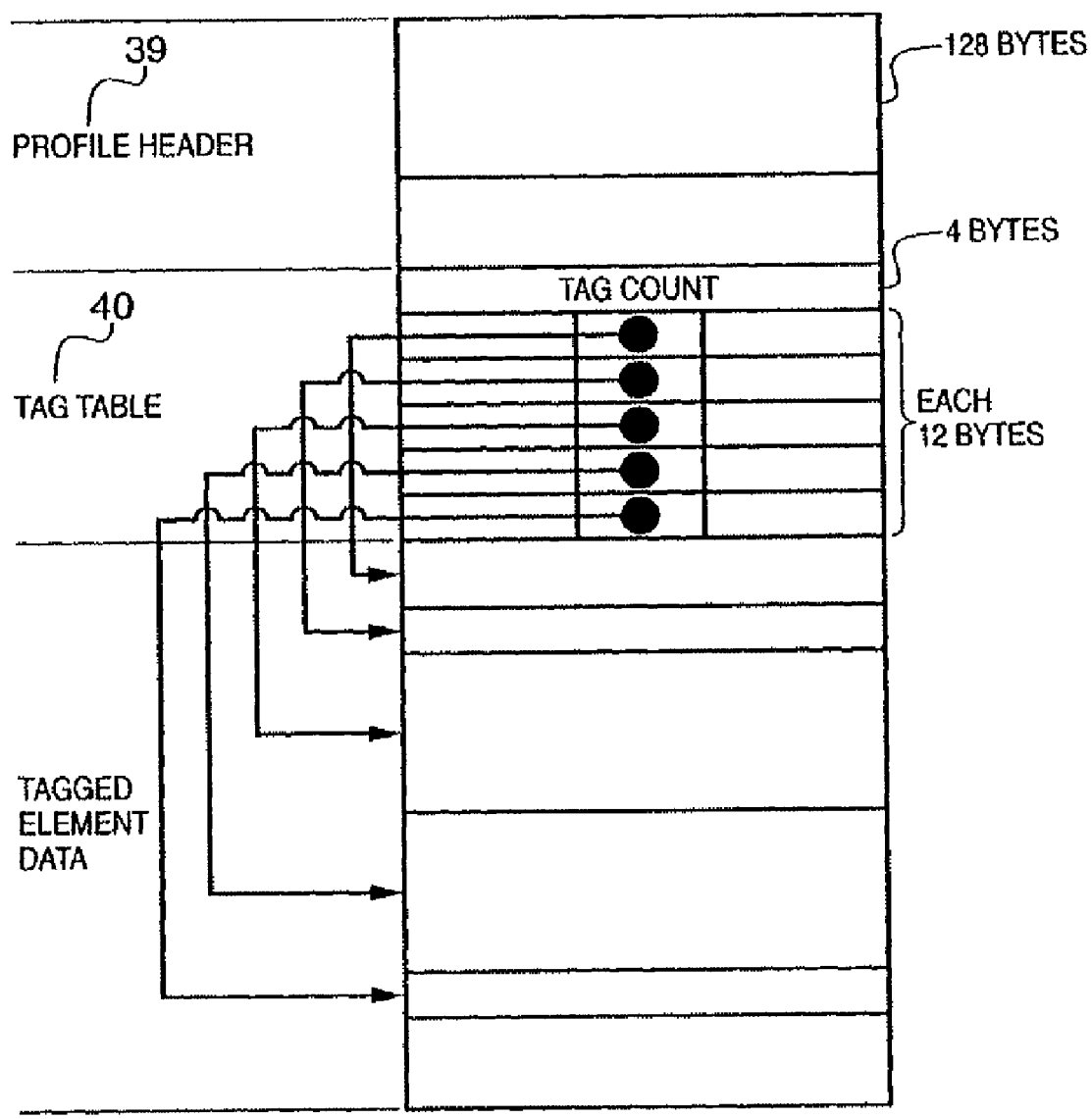
FIG. 4 is a schematic diagram showing the structure of an ICC profile.

FIG. 4 is a schematic diagram showing the structure of the ICC profile. The ICC profile includes 2 basic elements, a header 39 and a tag table 40. The header 39 includes information such as ColorSync™ (color conversion engine, by Apple® Computer, Inc.) used by the CMM for processing input image data in accordance with the ICC profile.

The ICC profile includes a required public tag designed so as to sufficiently provide a series of information necessary for the CMM to convert color information between the PCS and the device-dependent color space. Further, the ICC profile may include an optional public tag for additional conversion and a customizable private tag for each developer to add a specialized value for the ICC profile.

To perform color conversion on input data, required are a profile description tag, a device maker tag, a device model name tag, a media XYZ white point tag, a UCCMS private information tag, a copyright tag, a color material tag including respective RGB relative XYZ tristimulus values, gamma tags of R (red) channel, G (green) channel and B (blue) channel, and the like.

To perform color conversion for screen display, required are the profile description tag, the device maker tag, the device model name tag, the media XYZ while point tag, the copyright tag, color material tag including respective RGB phosphor relative values, the gamma tags of R channel, G channel and B channel, and the like.

To perform output color conversion for hard copy, required are the profile description tag, the device maker tag, the device model name tag, an AtoB0 tag, a BtoA0 tag, a gamut tag, an AtoB1 tag, a BtoA1 tag, an AtoB2 tag, a BtoA2 tag, a UCCMS private information tag, the media XYZ white point tag, a measurement tag, the copyright tag, and the like.

The AtoBx tag has an ICC lut 8 Type or ICC lut 16 Type structure. A general model of the ICC lut 8 Type or ICC lut 16 Type is as follows.

Matrix→1-dimensional LUT→multi-dimensional LUT→1-dimensional LUT

In a case where the tag has the lut 8 Type structure, the input and output LUTs and the color LUT are arrays of 8-bit signless values. The respective input tables are constructed with 1-byte integers. Further, entries for the input table are appropriately standardized to 0 to 255.

The AtoBx tag included in the ICC profile for output device includes a color conversion table for conversion from the CMYK color space to another color space referred to when the profile is used as a so-called source (or target) profile.

On the other hand, the BtoAx tag includes information for reversed conversion from the Lab color space to the CMYK color space, and mainly referred to when the profile is used as a destination profile.

The AtoB0 and BtoA0 tags are used for perceptual color conversion. These tags are mainly used for color matching premised on brightness preservation appropriate to a photographic image with priority on gradation reproduction.

The AtoB1 and BtoA1 tags are used for color conversion to reduce a color difference to a minimum. These tags are effective in a case where a color reproduction range of an output device is wider than that of a target in all the areas and in a case where an image does not exist in a high saturation area. Further, this color matching is employed for color reproduction of logo mark such as a company emblem since color prescription is strict.

The AtoB2 and BtoA2 tags are used for saturation-preserved color conversion. Although these tags are not appropriate to gradation reproduction, they are used in color matching of a business graphic image.

The gamut tag is a 1-input 1-output one-dimensional lookup table (LUT) describing whether or not reproduction is possible in an output device to an input channel (Lab). The gamut tag has the same format as that of the AtoB0 tag.

Figure 5:
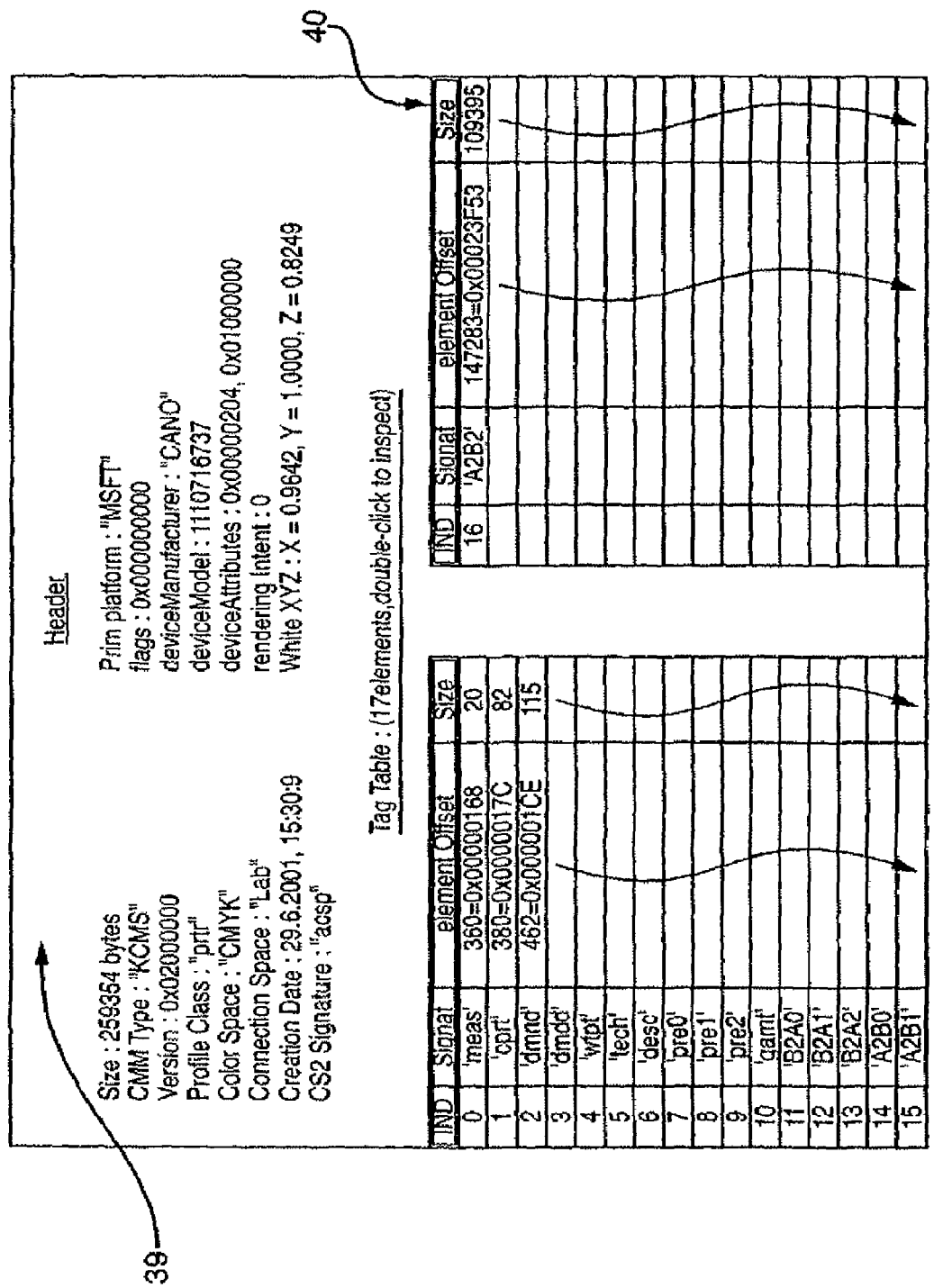
FIG. 5 is an example of details of the ICC profile.

FIG. 5 is an example of details of the ICC profile. The header 39 and the tag table 40 have the following items.

Size: defines a profile size.

CMM Type: describes a CMM among plural CMMs included in a computer used as a default CMM. For example, "Appl" or "ACMS" means the above-described Color-Syn™; "KCMS", Kodak® CMS (color conversion engine by Eastman Kodak® Company).

Version: indicates a profile version.

Profile Class: defines a profile type with one of the following parameters:
  output . . . output device such as a printer
  input . . . input device such as a scanner or digital camera
  display . . . display device such as a CRT or liquid crystal display
  device link . . . a combined structure of plural profiles
  color space conversion . . . conversion between non-device type profiles such as Lab/XYZ color space conversion
  abstract . . . a specific method for color data conversion between PCSs (Profile Connection Spaces)

Color Space: defines a color format upon conversion of color image data based on a profile, such as RGB, XYZ, GRAY (gray scale), CMY, Luv, HSV, CMYK, YCbr, HLS, Lab or Yxy.

Connection Space: defines profile connection space such as Lab or XYZ.

Creation Date: defines date of generation of profile.

CS2 Signature: defines a file signature of a profile, used for generation of an icon by the operating system (OS) of a device using the profile.

Prim platform: defines a platform or OS in which the profile is generated with any one of the following parameters.
  Appl . . . OS of Apple® Computer, Inc.
  MSFT . . . OS of MicrosoftoCorporation
  SGI . . . Silicon Graphicse
  SUNW . . . . Sun®
  TGNT . . . Taligent®

Flags: includes hint information for the CMM. If it indicates "embedded/not embedded", it means a profile embedded in an image file or the like/independent profile. If it indicates "embedded only/use any where", it is usable only in embedded status/usable even when separated.

device Manufacturer: describes a maker of the profile.

device Model: defines a model number or name of a device to use the profile. Note that the device Model parameter must be in conformity with the definition of the ICC, ColorSync™ of Apple® Computer, Inc., and ICM of Microsoft® Corporation. Especially, the model number or name must be 4-byte ASCII character string using "A" to "z" characters (capital letters) and "0" to "9" numerals.

device Attributes: describes transparency upon profile generation and surface glossiness. For example, "Reflective/Transparency" (reflective color/transparent color), "Glossy/Matte" and the like are described.

Intent: defines a profile design intent, i.e., perceptual, color difference (relative calorimetric or absolute calorimetric) minimized or saturation oriented.

White XYZ: defines PCS XYZ chrominance values and describes values normalized from white XYZ values.

In this manner, the header 39 is not a list including all the information necessary for storage into the header, but the header merely shows an example of information storable in the header.

The tag table 40 includes a tag list and information on the tags, with the public tags and private tags. As described above, the public tag defines a normal color conversion operation available in all the ICC profile. An example of the public tag defined in the tag table 40 is 3.times.3 color conversion matrix processing, 3-dimensional LUT and AtoB2 including 2 of three 1-dimensional LUTs. Another example of the public tag is described in more detail in ICC profile format document.

First Embodiment

Although the details are to be described later, according to the first embodiment, in a system to generate an ICC profile as device-dependent color conversion information, the gloss information merely described as "glossy/matte" is expanded to gloss information including glossiness, and gloss matching as well as color matching can be realized. The gloss information describing glossiness is described in the private tag of the ICC profile and referred to in accordance with necessity. In other words, the first embodiment shows a system which generates an ICC profile where the glossiness information is described in the private tag.

[Input of Glossiness Information]

Figure 6:
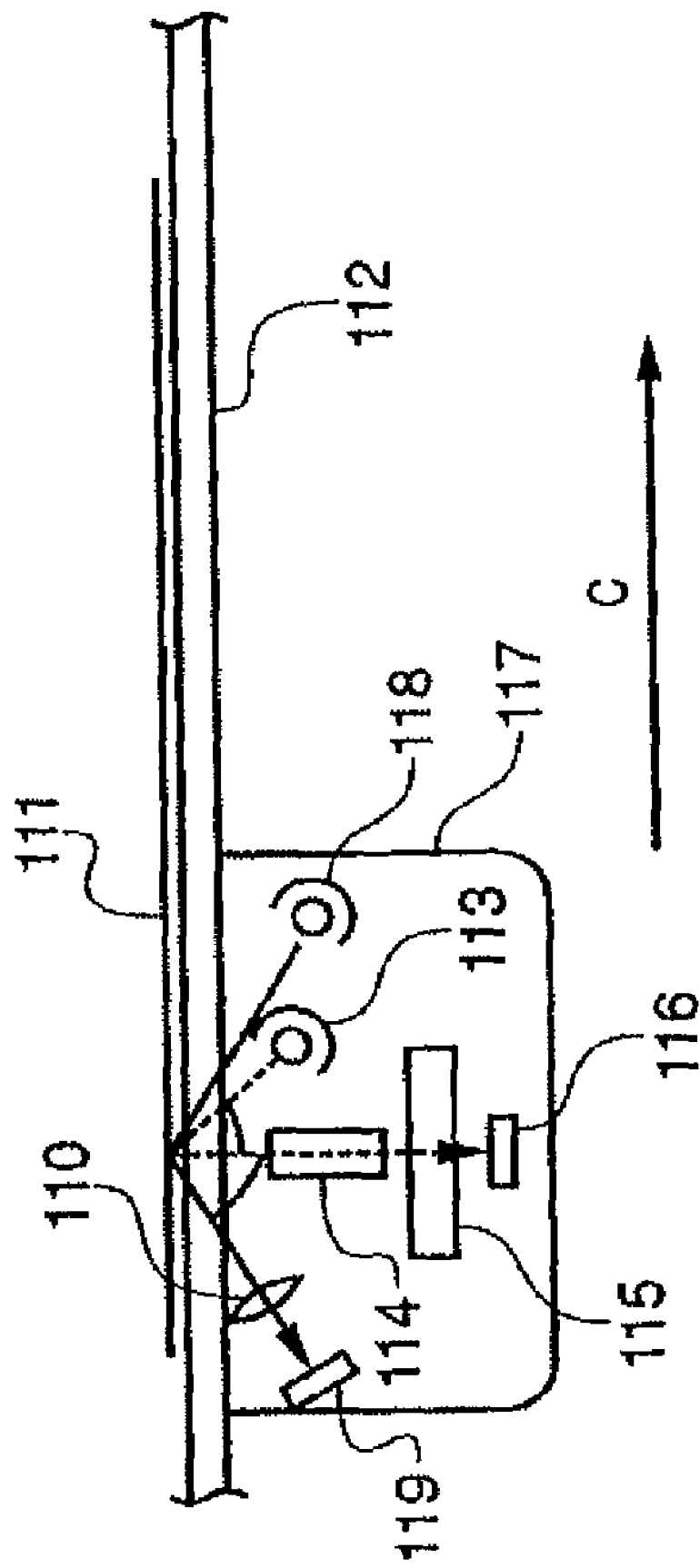
FIG. 6 is a schematic cross-sectional view of an image reading unit of a scanner.

The glossiness information described in the private tag is measured by a scanner of the color copier 16 connected to the computer 1. FIG. 6 is a schematic cross-sectional view of an image reading unit of the scanner.

The image reading unit detects an irregular reflection component of light emitted from a light source 113 reflected from an original 111 placed on a glass plate 112, by a CCD 116 via an image formation array 114 and an infrared-ray cut filter 115, and converts the component into a color signal.

On the other hand, to obtain the glossiness, the image reading unit inputs light, outputted from the light source 118 and reflected from the original or the like placed on the glass plate 112, via a focusing lens 110 into a photoreception unit 119 provided in a position opposite to the light source 118 at a regular reflection angle, and converts the amount of regular reflection light from the original or the like into an electric signal, thus converts to the glossiness information.

Upon image reading and glossiness acquisition, a scanner unit 117 having the above-described optical devices is moved in an arrow C direction in FIG. 6, to scan the original or the like. Based on image information read by the CCD 106, the range of original, an optimum irradiation light amount and the like are determined by operation-processing. Further, the amount of reflection light is converted to the glossiness (gloss value) based on the image information read by the photoreception unit 119.

Note that the glossiness is a value with the glossiness of glass surface with a refraction factor of 1.567 as 100, as defined in the JIS Z 8741.

[Generation of ICC Profile]

Next, a procedure of generation of ICC profile will be described. Note that as a subject device of the gloss information, an electrophotographic type printer is employed, however, the device is not limited to the electrophotographic type printer.

The ICC profile has a very simple description of input/output relation for realizing conversion "device-dependent color space device-independent color space". Accordingly, the color characteristic of the device must be grasped first.

Figure 7:
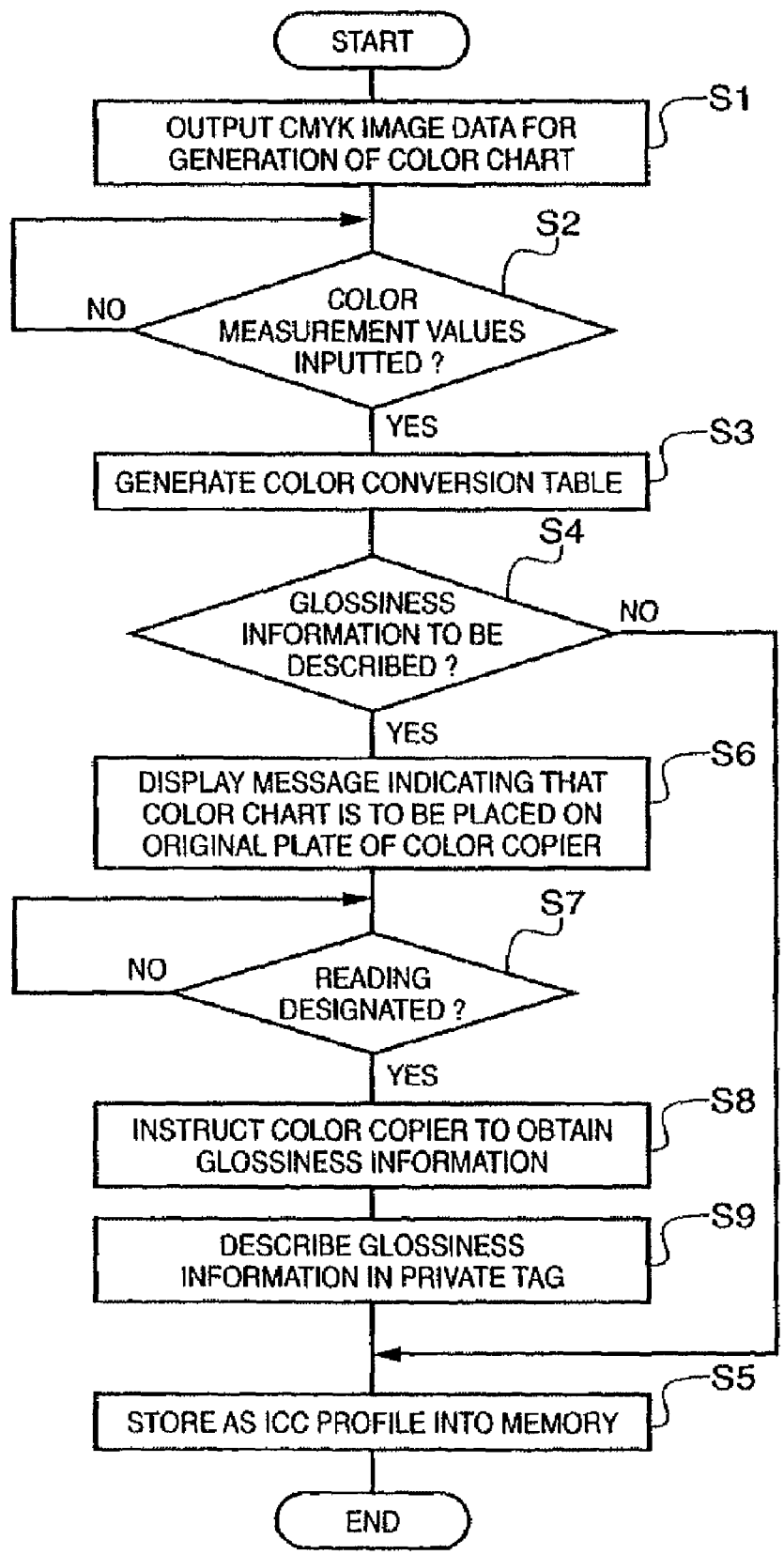
FIG. 7 is a flowchart showing an ICC profile generation procedure.

FIG. 7 is a flowchart showing the ICC profile generation procedure. The processing is realized by execution of a profile generation application by a CPU 20.

The CPU 20 outputs CMYK image data for formation of a color chart constructed with plural color patches (S1). Generally, a large number of ICC profile generation applications utilize ISO-managed IT8.7/3 928 patches, image data for the IT8.7/3 928 patches is used in the present embodiment.

The color copier 16 forms a color chart on a print medium based on the image data outputted from the CPU 20. The respective color patches of the color chart are measured by the color measuring unit 15, and color measurement values (Lab data) resulted from the color measurement are inputted into the computer 1.

When the color measurement values are inputted (S2), the computer 1 generates a BtoAx table as a Lab→CMYK conversion table and an AtoBx table as a CMYK→Lab conversion table based on the color measurement values and the image data of the color chart (S3).

Generally, as an output device forms an image by using CMYK color materials, the total sum of the respective color component signals (hereinbelow, referred to as a "signal sum") is 0 to 400% in principle, however, in consideration of a toner (or ink) consumption amount, actual necessity of color reproduction, a toner fly loss (the amount of undried ink) and the like, the signal sum in the output device is limited to 240 to 300%. In many profile generation applications, the upper limit of signal sum can be changed by a user such that a color reproducibility oriented user can set the toner consumption amount to a large value, otherwise a toner cost oriented user can set the toner consumption amount to a small value.

In the profile generation application 10 of the present embodiment, the signal sum can be set by a user, i.e., the limit of the signal sum can be set within a range of 240 to 400%. In a case where the limit of signal sum is designated, lowest brightness points are set as follows. For example, if the signal sum is set to 280%, the lowest brightness point of K is set to 100% and CMY, respectively to 60% (total 280%), and a color conversion table is generated by using the signals set as above.

The CPU 20 ask the user whether or not the glossiness information is to be described by displaying a dialog on the monitor 2 (S4). If the user instructs not to embed the information, the CPU 20 adds the Size, the CMM Type, the Profile Class, the White XYZ and the like to the generated conversion table, and stores the table as an ICC profile into a predetermined area of the HD 7 or the like (S5). That is, the ICC profile is stored as a general ICC profile without gloss information.

On the other hand, if the user has instructed to embed the glossiness information, the CPU 20 displays a message "Place color chart on glass plate of color copier" or the like on the monitor 2 (S6) so as to obtain the glossiness information. In response to the message, the user puts the above-described color chart on the original glass plate, and clicks, e.g., a "Read" button displayed on the monitor 2.

When reading is designated (S7), the CPU 20 instruct the color copier 16 to obtain the glossiness information (S8). In response to this instruction, the color copier 16 obtains the glossiness information and transmits the glossiness information to the computer 1. The computer 1 obtains the glossiness information, and describes the glossiness information in the private tag of the ICC profile (S9), thereafter, the process proceeds to step S5.

The glossiness information has the following format according to the profile generation application 10.

ave_G tag: average glossiness

Sig_G table tag: signal sum (0 to 300%) to glossiness (0 to 100)

white_G tag: medium glossiness (glossiness of patch with respective 0% image signals)

The above ave_G tag shows average glossiness of nine patches including the lowest brightness patch, a red patch of 100% yellow and 100% magenta, a green patch of 100% cyan and 100% yellow, a blue patch of 100% cyan and 100% magenta, a white patch of respectively 0% colors, a yellow patch of 100% yellow, a magenta patch of 100% magenta, a cyan patch of 100% cyan, and a black patch of 100% black.

The white_G tag has a description of glossiness of respectively 0% colors.

The Sig_G table is a 1-dimensional LUT like a table include in the BtoAx tag, in which the relation between an input value 8-bit normalized (300%→255) from the signal sum 0 to 300% and an 8-bit normalized value (100→255) from glossiness 0 to 100 is described. More specifically, in a table corresponding to the signal sum of 0 to 100%, the relation between each of CMYK single color gray scales and the glossiness are averaged (CMYK averaged). In a table corresponding to the signal sum of 100 to 200%, the relation between RGB (secondary colors) grayscales and the glossiness are averaged (RGB averaged). In a table corresponding to the signal sum of 200 to 300%, the relation between process black obtained by combining CMY colors and the glossiness is described.

As the above-described glossiness information is described in the private tag, gloss matching can be performed so as to eliminate unnaturalness of glossiness in a halftone portion of an image. Note that the unnaturalness of glossiness includes a phenomenon that on a high-glossiness print medium, the glossiness is lowered in a halftone portion due to toner difference, and the glossiness is increased as toner density is increased due to the glossiness of toner. In such case, in a portrait or the like, unnaturalness of glossiness appears as glary eyes, light-reflective shadow of a teethridge or the like.

Figure 8:
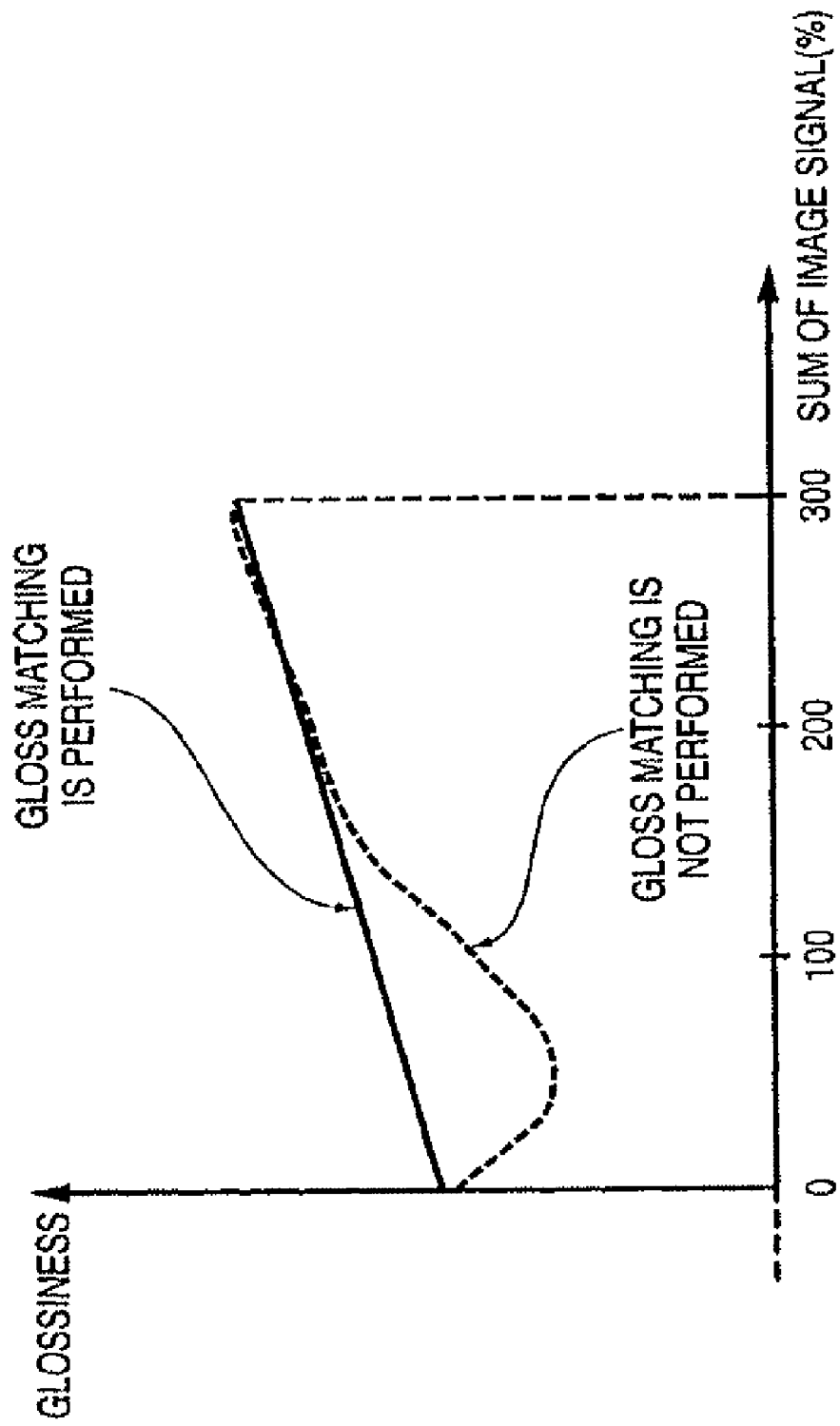
FIG. 8 is a graph showing glossiness in case of gloss matching and glossiness without loss matching.

Note that FIG. 8 shows glossiness in a case where gloss matching is performed and glossiness in a case where gloss matching is not performed. It is understood from the graph that the relation between the signal sum and the glossiness becomes linear by gloss matching, whereby unnaturalness of glossiness can be reduced.

Embodiment

Hereinbelow, utilization of an ICC profile in which the glossiness information is added will be described as an embodiment.

[Usage 1]

The CPU 20 that performs the profile generation application 10 stores the ICC profile where the glossiness information is described by the above procedure into the ICC profile storage area of the HD 7 such that another application can use the profile. More particularly, in case of Windows®, the CPU 20 stores the profile into a "System.Yen.Color" folder, and in case of Mac OS®, into a "System folder:ColorSync profile" folder.

As the ICC profile can be handled as a general data file, the user of the computer 1 can deliver the ICC profile, publicize the profile on a server, or download the profile to an image forming apparatus. Further, the computer 1 can instruct various printers and copiers to output an image via a network.

Figure 9:
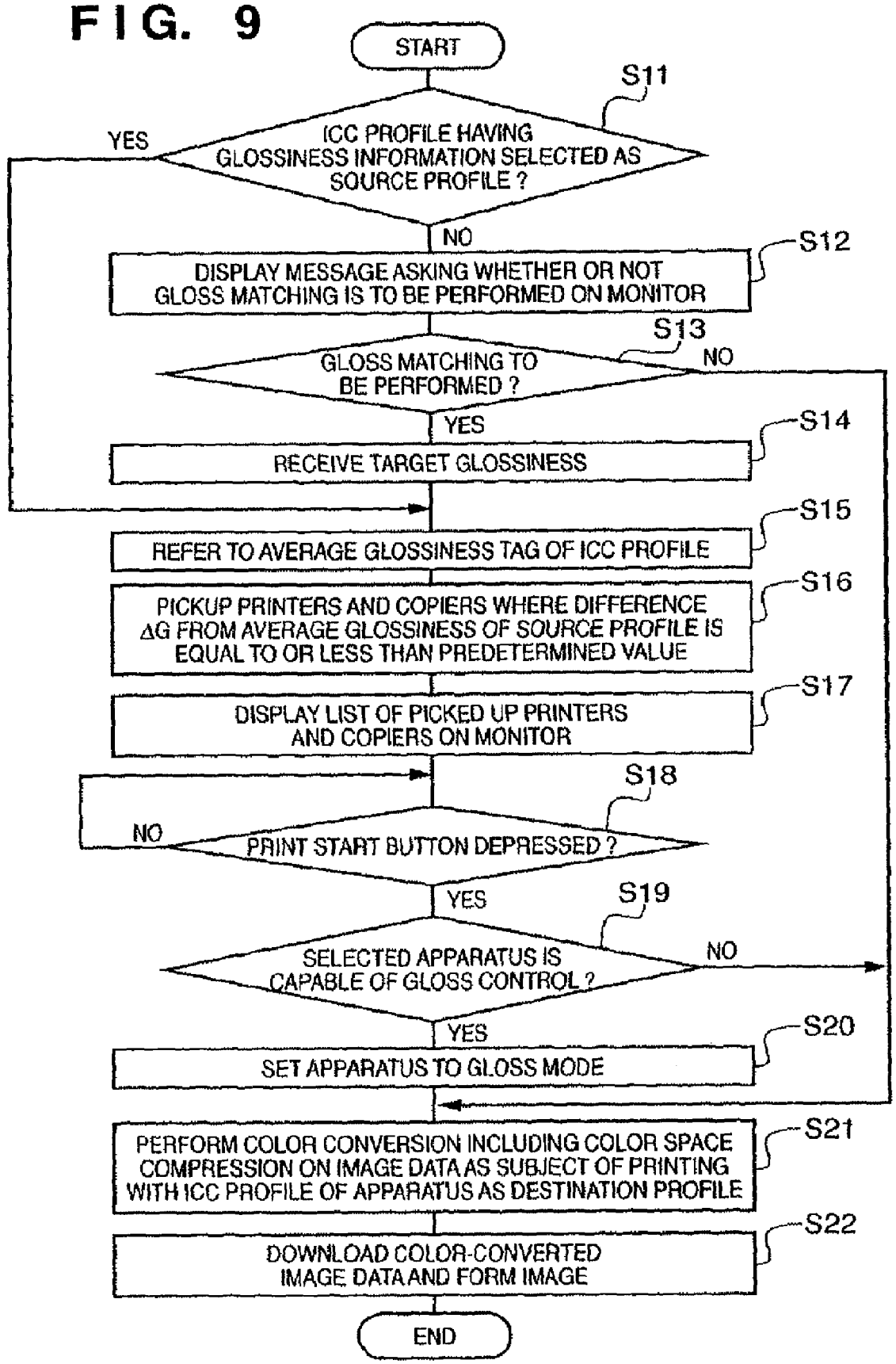
FIG. 9 is a flowchart showing utilization of the ICC profile having glossiness information.

FIG. 9 is a flowchart showing the utilization of the ICC profile having glossiness information. The processing is realized by the CPU 20 to execute the CMS 6 upon the user's designation of printing.

First, it is determined whether or not the user has selected the ICC profile having glossiness information as a source profile (S11). If the ICC profile having glossiness information has been selected as a source profile, the average glossiness tag (ave_G tag) is referred to in ICC profiles of printers and copiers registered in the computer 1 (plural ICC profiles per 1 apparatus may be registered) (S15). Then printers and copiers in which the difference .DELTA.G between the average glossiness and that of the source profile is equal to or less than a predetermined value are picked up (S16). Then a list of the picked up printers and copiers is displayed on the monitor 2 (S17).

The user can select a printer or copier to be used from the list displayed on the monitor 2. The printers and copiers picked up by the CPU 20 are not necessarily positioned near the user but they may be positioned on, e.g., a different floors. Note that the list may show the apparatus names in the order of e.g., ΔG.

When the user selects an apparatus from the list displayed on the monitor 2 and clicks, e.g., a "print start" button displayed on the monitor 2 (S18), the CPU 20 determines whether or not gloss control is possible in the selected apparatus (S19). If the gloss control is possible, the CPU 20 sets the apparatus to a gloss mode (S20), performs color conversion including color space compression on image data as the subject of printing, with the ICC profile of the selected apparatus as a destination profile (S21), and downloads the color-converted image data to the selected apparatus and causes the apparatus to form an image (S22).

Note that if the glossiness changes, as the regular reflection component to incident light changes, the irregular reflection component regarding colors also changes. Accordingly, an ICC profile of a image forming apparatus capable of gloss control must be prepared by gloss mode.

Further, if the ICC profile having glossiness information has not been selected as a source profile, a message asking whether or not gloss matching is to be performed is displayed on the monitor 2 (S12). If an instruction to perform gloss matching is received from the user (S13), target glossiness inputted by the user from a keyboard or the like is received (S14), then the process proceeds to step S15. Further, if gloss matching is not to be performed, as a predetermined printer or copier has been selected, the process proceeds to step S21.

[Usage 2]

As described above, the ICC profile having glossiness information can be uploaded to a server or the like on a network. Then hereinbelow, an example where the ICC profile having glossiness information is uploaded and registered in a print server on a network will be described.

The print server is connected to plural/plural types of image forming apparatuses. The print server has functions of managing current statuses of the image forming apparatuses, detecting an error such as "no paper", "paper jam" "no toner", and notifying the error statuses, a function of registering and managing ICC profiles of the respective image forming apparatuses, a RIP (Raster Image Processing) function of mapping image data in page description language (PDL), and the like. Further, the print server can perform so-called cluster printing of causing plural image forming apparatuses to perform 1-job image formation.

Figure 10:
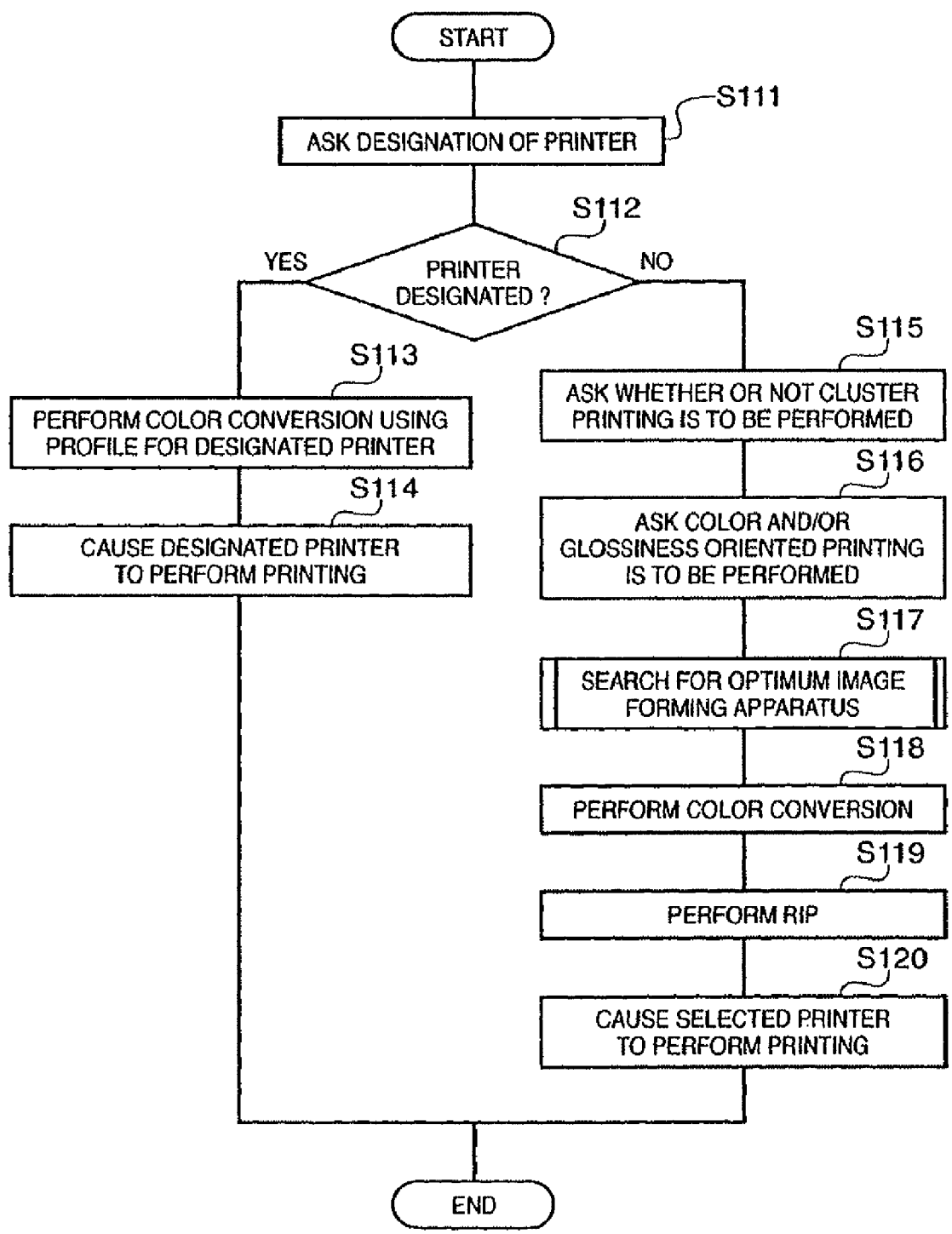
FIG. 10 is a flowchart showing processing by a print server.

FIG. 10 is a flowchart showing processing executed by the print server upon reception of a print instruction from the computer 1 or the like.

First, the print server transmits data asking the user's designation of printer to the computer 1 (S111). When a printer has been designated (S112), the print server performs color conversion including color space compression on received image data using the profile of the designated printer (S113), and causes the designated printer to perform printing (S114).

On the other hand, if no printer has been designated, the print server transmits data asking the user whether or not the cluster printing is to be performed to the computer 1. When the user's response has been received (S115), the printer server transmits data asking the user's selection of color and/or glossiness oriented printing as follows to the computer 1 (S116):

color oriented
glossiness oriented
glossiness most oriented and color oriented
color most oriented and glossiness oriented First, the utilization of the ICC profile having glossiness information will be described in a case where "cluster printing is not to be performed" and "glossiness oriented" have been selected.

If the "glossiness oriented" printing has been selected, the print server refers to the ICC profile having glossiness information and searches for an optimum image forming apparatus (S117) based on target glossiness information (the glossiness information of a target profile) designated by the user or print sheet setting condition (glossiness "low (~15)", "intermediate (16~40)" or "high (41~)"), and designation of glossiness.

The target ICC profile can be embedded in a TIFF image file or the like, Accordingly, if an image file where a target profile having glossiness information is embedded is downloaded to the print server, the print server can search for an image forming apparatus matching with the glossiness.

Glossiness Oriented

Figure 11:
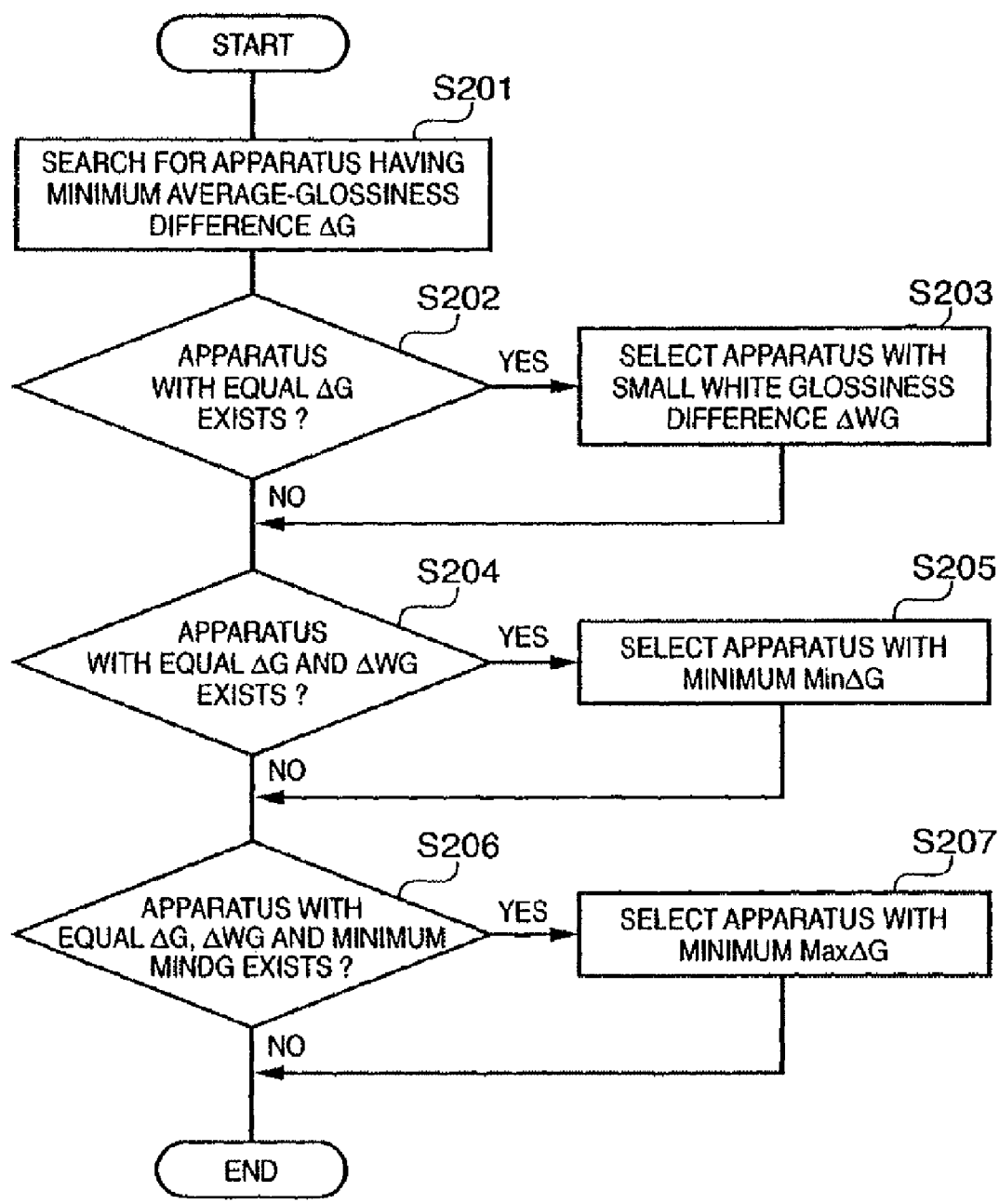
FIG. 11 is a flowchart showing the details of search for optimum apparatus upon selection of "glossiness oriented" printing.

FIG. 11 is a flowchart showing the details of the search for an optimum image forming apparatus upon selection of the "glossiness oriented" printing.

First, the ave_G tag is referred to and a search is made for an apparatus having a minimum average glossiness difference ΔG (S201).

$$\Delta G = |Gt - Gd|$$

Gt: target average glossiness
Gd: destination average glossiness

If an apparatus with an equal ΔG exists (S202), the white_G tag is referred to and a search is made for an apparatus having a small white glossiness difference ΔWG (S203). Note that if the target profile does not have the glossiness information, print sheet setting is referred to; the white glossiness of normal paper is "low (~15)", that of glossy paper is "intermediate (16~40)", and that of cast coat paper is "high (41~)".

In a case where an apparatus having equal ΔG and ΔWG exists (S204), the Sig_G table tag is referred to, and an apparatus having a minimum Min ΔG is selected (S205). Note that the difference Min ΔG is derived from the Sig_G table tag.

In a case where an apparatus having equal ΔG, ΔWG and Min ΔG exists (S206), the Sig_G table tag is referred to, and an apparatus having a minimum Max ΔG is selected (S207). Note that the difference Max ΔG is derived from the Sig_G table tag.

Next, the print server performs color conversion including color space compression using the ICC profile of the selected image forming apparatus and the target ICC profile intended by the user (S118), performs RIP (S119), transmits bitmap data to the selected apparatus to form an image (S120).

It is desirable that the target profile is registered in the computer 1 or the like and further registered in the print server. In this case, even if the profile is not embedded in an image file, the print server can perform color conversion, gloss matching and the like in accordance with settings of the printer driver, and thus the load on the computer is reduced and the processing speed is improved. Further, color matching and gloss matching can be easily performed without expert knowledge.

Color Oriented

On the other hand, if the "color oriented" printing has been selected, the print server refers to the gamut tag and the AtoB2 tag of the destination profile (ICC profile of the image forming apparatus) and compares the information with the color gamut of the target profile. The color gamut comparison includes:

(1) determination as within/without color gamut of color solid (similar to color gamut warning function of Photoshop® 6.0)

(2) comparison between color gamut volumes (comparison between volumes converted from color reproduction ranges (Lab))

(3) comparison between particular points (C, M, Y, K, R, G, Bk, W and the point of lowest brightness (9 points))

Considering that the color gamut is determined in all the ICC profiles registered in the print server and an optimum image forming apparatus is selected, the above comparison (3) is employed in view of the period of determination and the comparison accuracy. That is, the AtoB2 tag in the destination profile is referred to, and Lab values in the above 9 points are obtained. Note that a signal sum of 400% is employed as the point of lowest brightness. Similarly, Lab values in the above 9 points are obtained from the target profile, and a search is made for an image forming apparatus having a minimum average color difference .DELTA.E among the above 9 points (S117).

Note that if the color gamut of the destination profile is wider than that of the target profile, the color gamut of the target profile is satisfied. However, in the limited number of bits (e.g., 8 bits) of image data, as the color gamut is wider, the stepwise density differences are conspicuous in correspondence with the gradation steps (1/256level in 8-bit image data). In consideration of this inconvenience, a search is made for an optimum image forming apparatus by the color gamut comparison based on the ΔE without color-gamut portion in a color-solid (S117).

Glossiness Most Oriented and Color Oriented or Color Most Oriented and Glossiness Oriented On the other hand, if the "glossiness most oriented and color oriented" printing or the "color most oriented and glossiness oriented" printing has been selected, the glossiness information embedded in the ICC profile and the Lab values in the main 9 points as in the case of the "color oriented" are referred to, and a search is made for an image forming apparatus which satisfies the following condition (S117):

ΔG<5 and ΔE<5

Figure 12:
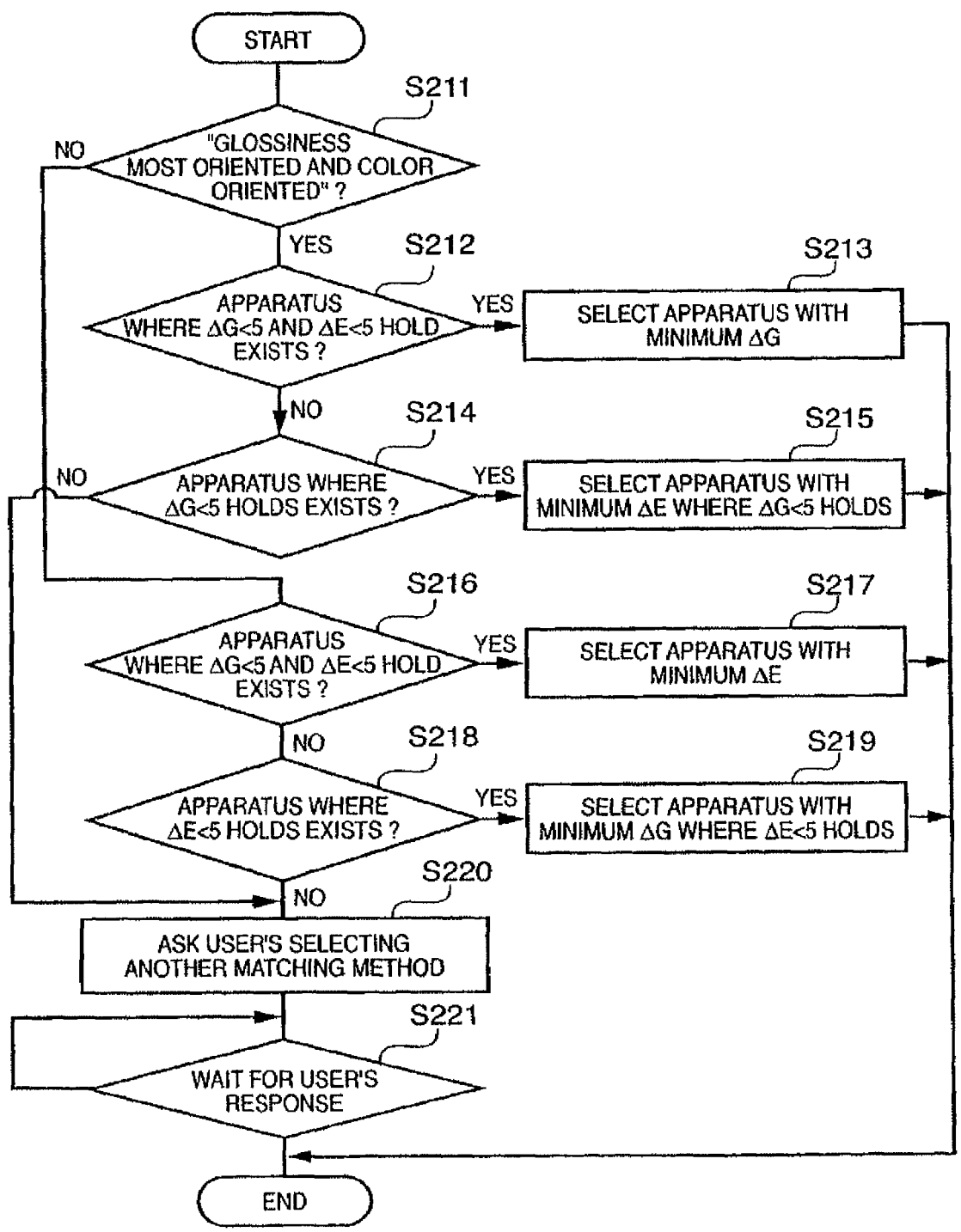
FIG. 12 is a flowchart showing the details of the search for optimum apparatus upon selection of "glossiness most oriented and color oriented" printing.

FIG. 12 is a flowchart showing the details of the search for optimum apparatus upon selection of "glossiness most oriented and color oriented" printing or "color most oriented and glossiness oriented" printing (S117).

In the case of the "glossiness most oriented and color oriented" printing (S211), it is determined whether or not an apparatus which satisfies the above condition exists (S212), and if YES, an apparatus having a minimum ΔG is selected (S213). Further, if the above condition is not satisfied, the condition of ΔE is removed, and it is determined whether or not an apparatus which satisfies the condition ΔG<5 exists (S214). If YES, an apparatus having a minimum ΔE where ΔG<5 holds is selected (S215).

On the other hand, in the case of the "color most oriented and glossiness oriented" printing (S211), it is determined whether or not an apparatus which satisfies the above condition exists (S216), and if YES, an apparatus having a minimum ΔE is selected (S217). Further, if the above condition is not satisfied, the condition of ΔG is removed, and it is determined whether or not an apparatus which satisfies the condition ΔE<5 exists (S218). If YES, an apparatus having a minimum ΔG where ΔE<5 holds is selected (S219).

Further, if no apparatus which satisfies the condition ΔG<5 exists in the case of glossiness most oriented printing, and if no apparatus which satisfies the condition ΔE<5 exists in the case of color most oriented printing, data indicating the search result and asking selection of another matching method is transmitted to the computer 1 (S220), and the user's response is waited (S221).

Cluster Printing

In a case where the user designates the cluster printing with emphasis on speed, the print server searches for an image forming apparatus with the above condition (ΔG<5 and ΔE<5) (S117).

Figure 13:
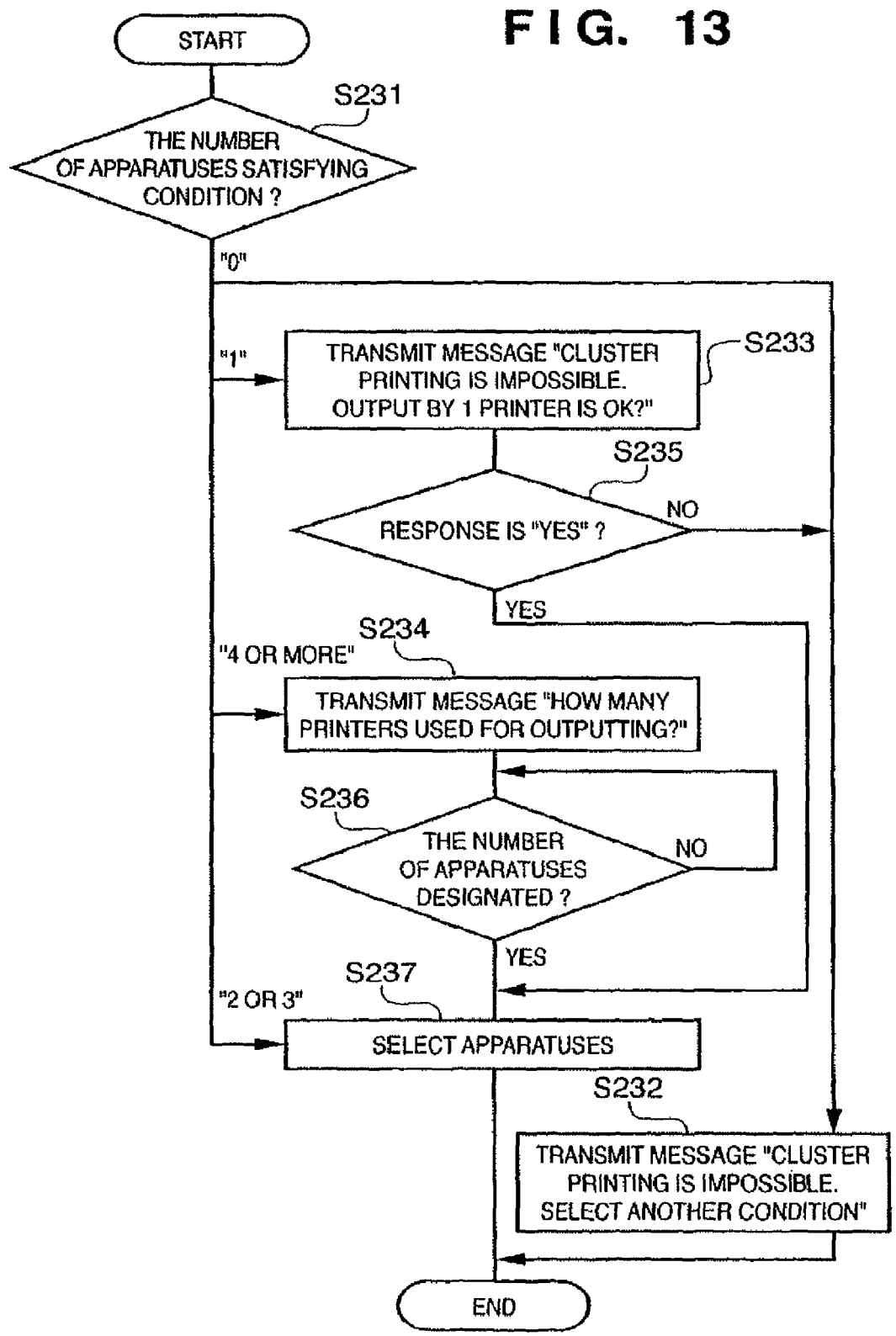
FIG. 13 is a flowchart showing the details of the search for optimum apparatus upon designation of cluster printing.

FIG. 13 is a flowchart showing the details of the search for an optimum apparatus upon designation of the cluster printing (S117).

If the "glossiness oriented" printing has been selected, the number of apparatuses which satisfy the condition ΔG<5 is grasped, and the process branches in correspondence with the number (S231). If the number of apparatuses satisfying the condition is "0", "1" or "4 or more", the following message is transmitted to the computer 1 (S232-S234).

"0": "Cluster printing is impossible. Select another condition"

"1": Cluster printing is impossible. Output by 1 printer is OK?"

"4": "How many printers used for output?"

The user's response to the message "Output by 1 printer is OK?" is determined (S235). If the response is "YES", 1 printer is selected (S237), while if the response is "NO", the message "Cluster printing is impossible. Select another condition" in the case of "0" is transmitted to the computer 1 (S232).

If the user designates the number of apparatuses by using a keyboard or the like in response to the message "How many printers used for output?" (S236), apparatuses are selected in correspondence with the designated number. For example, if 3 has been designated, 3 apparatus are selected from an apparatus with a minimum ΔG (S237).

Further, if the number of apparatuses satisfying the condition is "2" or "3", the print server selects 2 or 3 apparatuses without requesting an instruction from the user (S237).

If the "color oriented" printing has been selected, the number of apparatuses which satisfy the condition ΔE<5 is grasped. As in the case of the above selection, the process branches in correspondence with the number (S231), and apparatuses are selected (from a minimum ΔE) (S237).

If the "color most oriented and glossiness oriented" printing has been selected, the number of apparatuses which satisfy the conditions ΔE<5 and ΔG<5 is grasped. As in the case of the above selection, the process branches in correspondence with the number (S231), and apparatuses are selected (from a minimum ΔE) (S237).

If the "glossiness most oriented and color oriented" printing has been selected, the number of apparatuses which satisfy the conditions ΔE<5 and ΔG<5 is grasped. As in the case of the above selection, the process branches in correspondence with the number (S231), and apparatuses are selected (from a minimum ΔG) (S237).

In this manner, the glossiness and color reproducibility can be easily obtained in image forming apparatuses by utilizing the ICC profile having glossiness information, and (an) apparatus capable of image formation in correspondence with the user's request can be easily selected.

Second Embodiment

Hereinbelow, a second embodiment will be described as an example where the glossiness information is obtained by a different method from that of the first embodiment and embedded in an ICC profile. Note that in the second embodiment, constituent elements corresponding to those of the first embodiment have the same reference numerals and detailed explanations thereof will be omitted.

In the first embodiment, an image forming apparatus having a function unit of obtaining glossiness information is required. If costs are regarded as carrying higher priority than acquisition of glossiness information with ease, it is desirable that a handy-type of device for measuring glossiness (a "glossmeter") is employed, In the second embodiment, output information from a glossmeter is inputted into the computer 1, the input information is analyzed and glossiness information is embedded into the private tag of an ICC profile.

Figure 14:
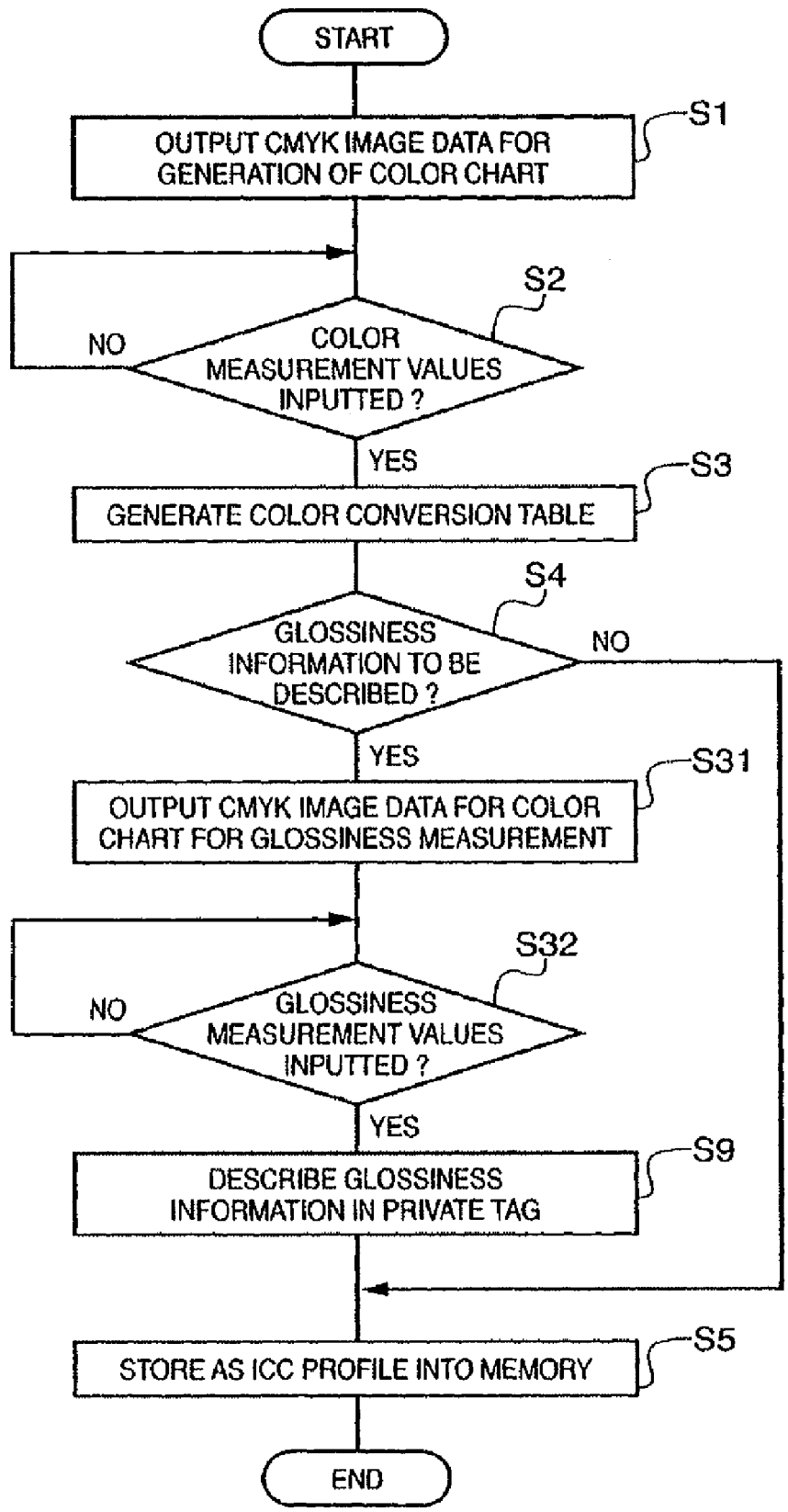
FIG. 14 is a flowchart showing the ICC profile generation procedure.

FIG. 14 is a flowchart showing the ICC profile generation procedure. The processing is realized by execution of the profile generation application by the CPU 20. Note that in the processing, steps corresponding to those in FIG. 7 have the same reference numerals and detailed explanations thereof will be omitted.

In the first embodiment, a color chart used for generation of color conversion table is used for measurement of glossiness. However, even if the size of the color chart is A3, the size of each color patch is merely 1×1 cm, which is too small to a commercial glossmeter. Further, it takes much time and labor to measure glossiness of 928 patches by the handy-type glossmeter, which is unpractical. Then, in consideration of measurement by the handy-type glossmeter, image data for a color chart where the items of glossiness described in an ICC profile are reduced and the number of color patches is greatly reduced is outputted, and a color chart is formed by the color copier 16 (S31). Then glossiness measurement values are inputted from the glossmeter (S32), step S9 is executed.

The items related to embedding of glossiness information into an ICC profile by using the handy-type glossmeter are:
ave_G tag
white_G tag That is, the Sig_G table tag that is embedded in an ICC profile in the first embodiment is not embedded in the second embodiment. As described above, the Sig_G table tag indicates the relation between signal sum and glossiness, and used in determination as to whether or not unnaturalness occurs in glossiness. The Sig_G table tag is a significant item, however, humans are more sensitive to mismatch between toner glossiness (glossiness characteristic to a signal at 70% or higher percentage). Accordingly, this tag is not used in a search for an optimum image forming apparatus, and in the second embodiment, the ave_G tag and the white_G tag are described in the private tag of the ICC profile.

As described above, the ave_G tag indicates the average glossiness of nine patches including the C, M, Y, Bk, R, G, B and W patches and the lowest brightness patch, and the White_G tag indicates the glossiness of patch with respectively 0% image signals.

Note that to input the measurement values from the handy-type glossmeter, a specialized interface may be provided for the glossmeter, however, the measurement values may be inputted via a network, a serial/parallel interface or a serial bus.

Further, the user inputs the measured value by using the keyboard 4 because there are a few patches to measure it with the glossmeter with nine.

Third Embodiment

Figure 15:
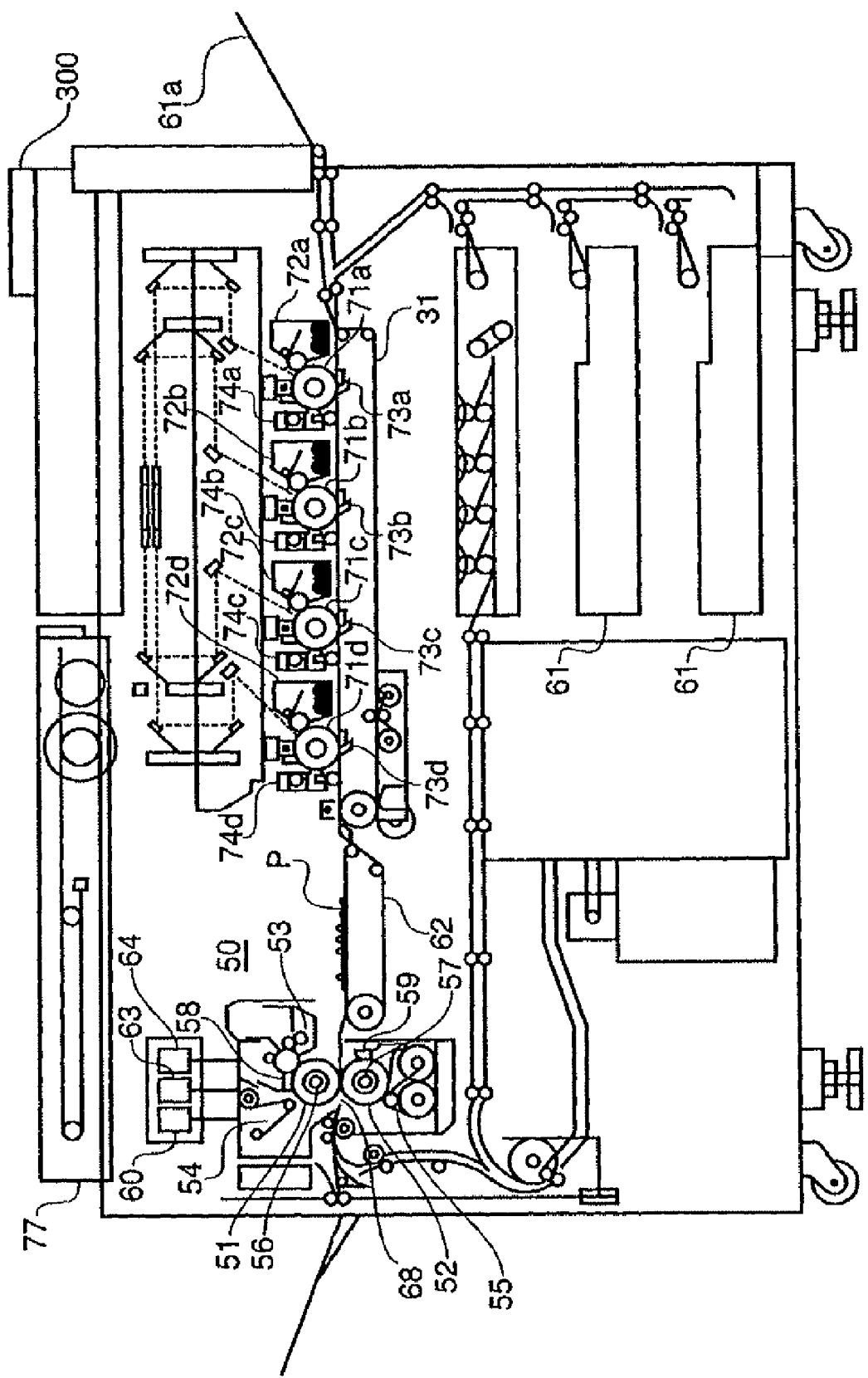
FIG. 15 is a schematic cross-sectional view of a color copier.

FIG. 15 is a schematic cross-sectional view of a color copier.

The color copier has 4 image forming stations to form respective magenta (M), cyan (C), yellow (Y) and black (K) color images. Since the respective image forming stations have the approximately the same construction, the construction of the magenta image forming station will be described and the other image forming stations will be omitted.

The image forming station has a charger, a cleaner 74a and a developer 72a around an electrophotographic photoconductor (hereinbelow "photoconductor drum") 71a as an image holder. The photoconductor drum 71a is rotatably supported, and a transfer unit provided between the developer 72a and the cleaner 74a below the photoconductor drum 71a. The transfer unit has a common transfer belt 31 for the respective image forming stations and a transfer charger 73a.

A print sheet supplied from plural paper cassettes 61 or a drawable manual paper-feed tray 61a is conveyed under the respective image forming stations by the transfer belt 31, while respective color toner images formed on the respective photoconductor drums are sequentially transferred onto the sheet, thus an image where the toner images are overlaid is formed. The print sheet P where the toner images are overlaid is separated from the transfer belt 31, and conveyed to a fixer 5 by a conveyance belt 62.

The fixer 50 has a rotatably-supported fixing roller 51, a pressing roller 52 rotatable in press-contact with the fixer roller 51, a moistening agent coater 53, a roller cleaners 54 and 55 and the like. Heaters 56 and 57 such as halogen lamps are provided inside the fixing roller 51 and the pressing roller 52, and temperature sensors 58 and 59 such as thermistors are arranged in positions near the surface of the fixing roller 51 and pressing roller 52. Accordingly, the temperatures of the fixing roller 51 and the pressing roller 52 detected by the temperature sensors are supplied to a temperature regulator 60, and the temperature regulator 60 controls electric power added to the heaters 56 and 57, thereby controls the surface temperatures of the fixing roller 51 and the pressing roller 52.

The moistening agent coater 53 coats the surface of the fixing roller 51 with silicon oil as a moistening agent such that toner is not attached to the surface of the fixing roller 51 when a print sheet passes between the fixing roller 51 and the pressing roller 52. Further, the moistening agent coater 52 is connected to a coating amount controller 63 to control the amount of silicon oil.

The fixing roller 51 and the pressing roller 52 are driven by a drive motor (not shown) connected to a speed controller 64 to control a paper conveyance speed, i.e., a rotation speed of the fixing roller 51 and the pressing roller 52.

In the above construction of the fixer 50, the respective color toners overlaid on the surface of the print sheet are melted and fixed to the print sheet, thus a full color image is formed on the print sheet. The print sheet where the full color image is fixed is separated from the pressing roller 52 by a separation claw 68, and discharged to the outside the apparatus.

Further, an original reader 77 optically scans an original placed on the original plate, then reads an image of the original and outputs respective RGB color image signals. An operation unit 300 having a display such as an LCD, 10 keys and the like is used for setting of the color copier, command input, display of operation status and the like.

[Image Processing Unit]

Figure 16:
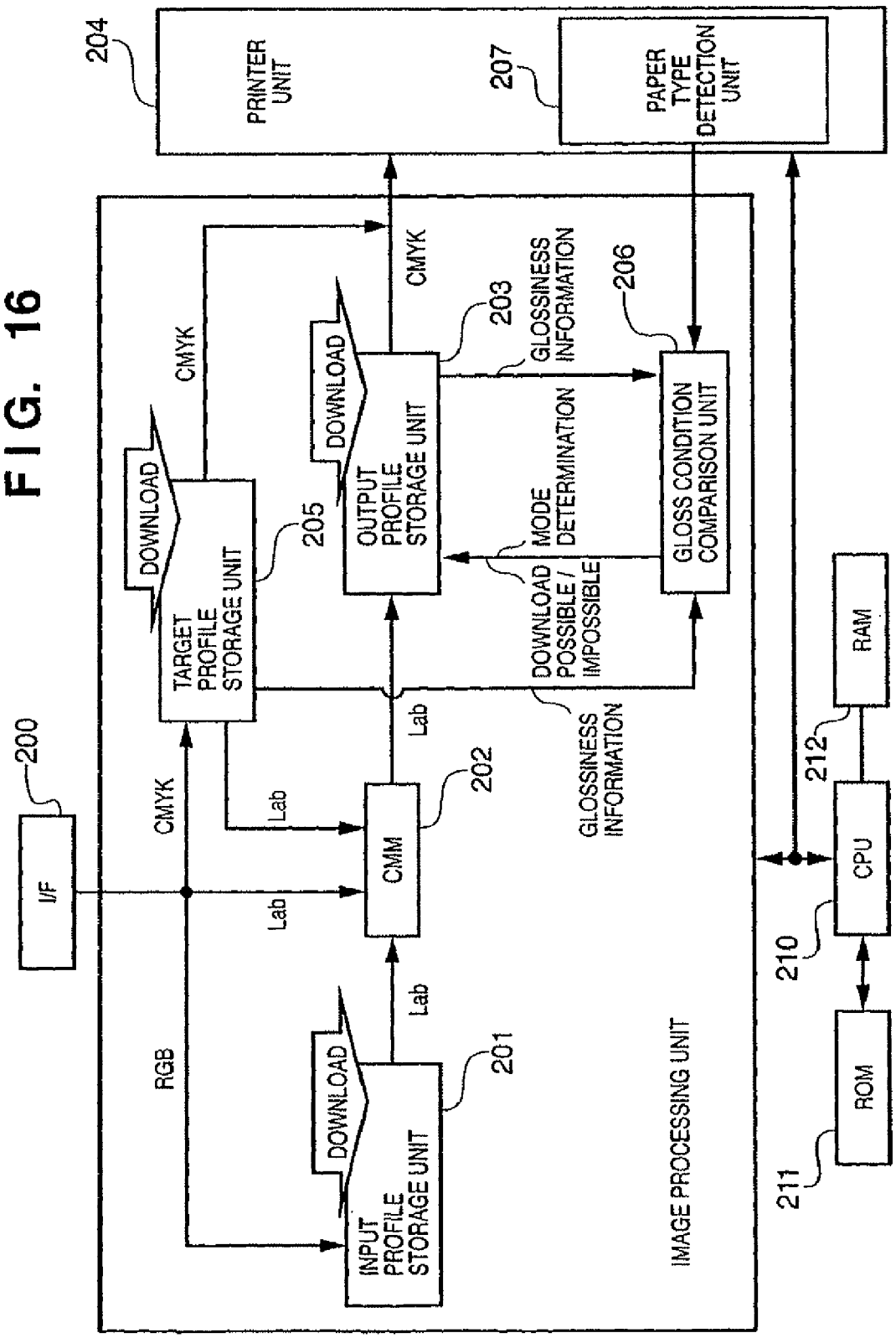
FIG. 16 is a block diagram showing the construction of a color conversion unit (a part of image processing unit) in the color copier.

FIG. 16 is a block diagram showing the construction of a color conversion unit (a part of the image processing unit) in the color copier. Note that as processing on the color conversion unit differs in accordance with type of signal inputted from the interface (I/F) 202, the processing will be described by signal type.

In a case where RGB signals are inputted, an ICC profile of input device stored in an input profile storage unit 201 is referred to. The input profile storage unit 201 holds input ICC profiles of targets sRGB, Apple® RGB, CIE RGB, NTSC (1953) and the like. The CMM 202 converts the input RGB signals to Lab signals using a profile designated by the user from these input profiles.

In a case were Lab signals are inputted, the Lab signals are converted to CMYK signals by referring to an output profile stored in an output profile storage unit 203 corresponding to a predetermined mode. The CMYK signals are sent to a printer unit 204.

In a case where CMYK signals as well as those for generation of device ICC profile are inputted, a target ICC profile is referred to in a target profile storage unit 205. The target profile storage unit 205 holds profiles of targets, SWOP Coated, EURO Standard, DIC (Dainippon Ink And Chemicals, Incorporated), TOYO (Toyo Ink MFG Co. Ltd.), Japan Color, various custom DDCPs and the like. The CMM 202 converts the input CMYK signals to Lab signals using a profile designated by the user from these profiles.

In a case where CMYK signals for grasping the color reproduction characteristic of the printer and generation of ICC profile or CMYK signals color-converted by a computer device are inputted, since further color conversion is insignificant, the color conversion processing is by-passed, and the CMYK signals are sent to the printer 204.

Note that in consideration of color change due to degradation of durability (variation per time) such as deterioration of developing material and deterioration of the fixing roller 51, an ICC profile can be downloaded to the respective profile storage units at any time.

Further, a gloss condition comparison unit 206 of the image processing unit and a paper type detection unit 207 of the printer unit 204 are utilized in a gloss mode to be described later.

[Control]

A CPU 210 in FIG. 16 controls the overall color copier using a RAM 212 as a work memory in accordance with a control program stored in a ROM 211. Further, the CPU determines whether or not the description in an ICC profile for the gloss mode to be described later is correct and whether or not a print sheet is set in a paper cassette 61 or the like for image formation corresponding to a gloss condition of the designated ICC profile. If a print sheet corresponding to the gloss condition is not set, the CPU 210 displays an error message on an operation unit 200 or changes a fixing condition as a backup measure.

[Determination of ICC Profile]

An ICC profile in a printer initial status is provided from a device maker. Note that the profile provided by the device maker is standard color conversion information, but the device does not necessarily have standard characteristic. For this reason, color-matching oriented users of designing and printing industries try to attain more accurate color matching by utilizing commercial ICC profile generation software, an ICC profile generation service provided by a device maker or software maker, and the like, In the color copier of the present embodiment, an ICC profile prepared by the user can be downloaded to the respective profile storage units in consideration of the above type of user.

The color copier of the present embodiment has a normal mode and a gloss mode as image output modes. The gloss mode is an image forming mode where the fixing condition and a condition of print sheet are set for improvement in glossiness of output image. Since the colors change as the glossiness of image changes, ICC profiles corresponding to the respective modes are stored in an output profile storage unit 203. Accordingly, when ICC profiles are downloaded to the output profile storage unit 203, the ICC profiles corresponding to the respective modes must be downloaded. For example, if an ICC profile generated based on a color patch formed on bond paper is downloaded as an ICC profile for gloss mode, the gloss mode cannot be effective.

Figure 17:
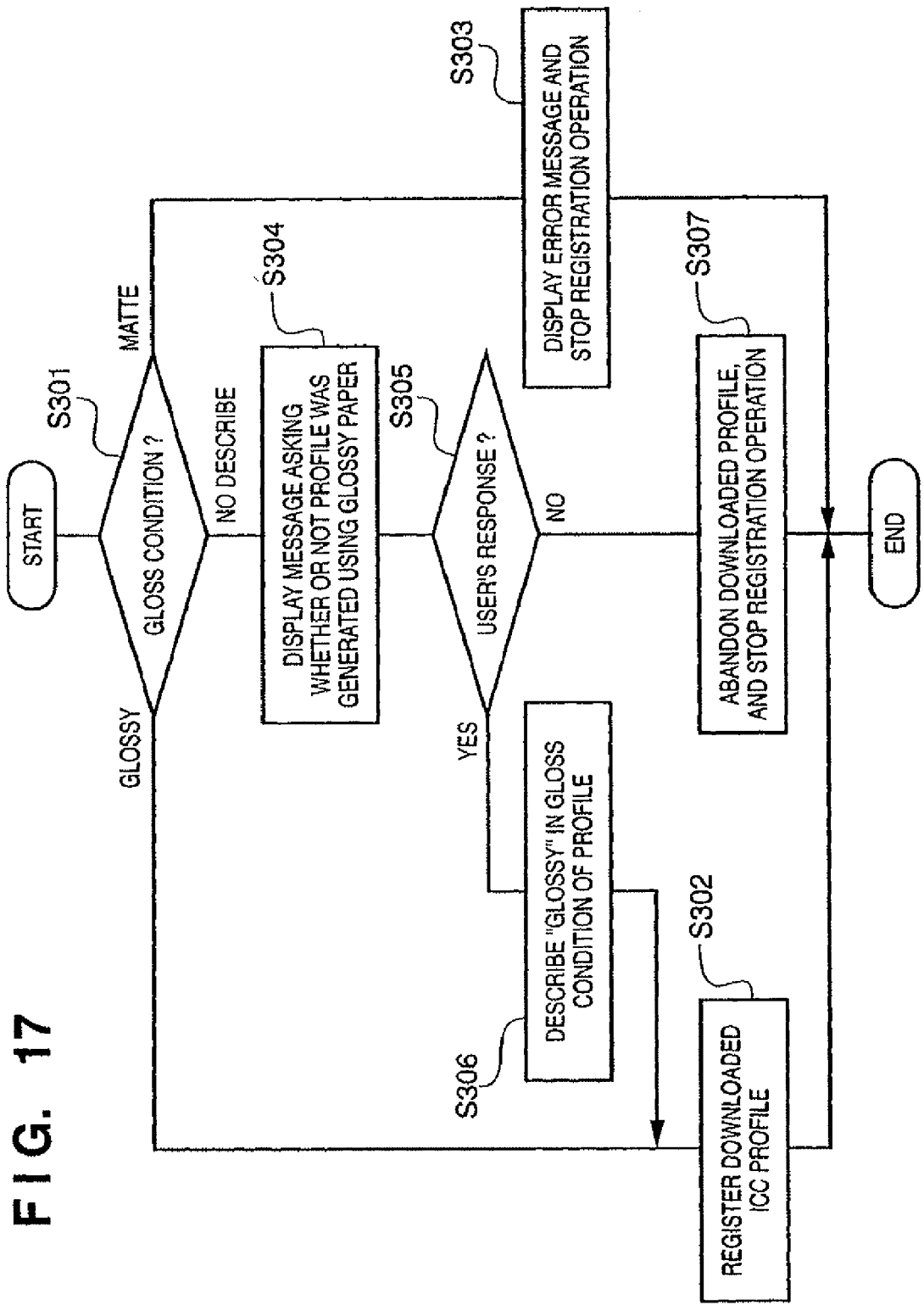
FIG. 17 is a flowchart showing ICC profile determination processing.

FIG. 17 is a flowchart showing ICC profile determination processing, executed by the CPU 210 when an ICC profile is downloaded to the output profile storage unit 203.

When downloading of ICC profile for gloss mode is designated, the CPU 210 refers to attribute information of the ICC profile, to determine whether or not the gloss condition is "glossy" (S301). If the gloss condition is "glossy", the downloaded ICC profile is registered in the output profile storage unit 203 (S302). On the other hand, if the gloss condition is "matte", the CPU displays an error message indicating "not registered" on the operation unit 300, and stops the registration operation (S303).

Further, if no description is found about the gloss condition, the CPU displays a message "This ICC profile was generated using glossy paper?" on the operation unit 300 (S304) and waits for the user's response (S305). If the user's response is YES, the CPU describes "glossy" in the gloss condition of the profile (S306), and registers the profile in the output profile storage unit 203 (S302). Further, if the user's response is NO, the CPU abandons the downloaded profile and stops the registration operation (S307).

Note that in a case where a profile is downloaded via a network from a computer device, the CPU transmits an error and inquiry to the computer device and waits for responses from the computer device via the network.

[Gloss Control]

Japanese Published Unexamined Patent Application No. Hei 2-132481 discloses a technique of obtaining information on paper type and especially paper thickness information from a paper feeding unit, and controlling a fixing temperature and pressure or a paper conveyance speed based on the paper type information, to solve problems of poor fixing and heat source capacity. Further, as paper type detection, paper type detection by density of print sheet disclosed in Japanese Published Unexamined Patent Application No. Hei 7-234610, paper type detection by spectral reflectance disclosed in Japanese Published Unexamined Patent Application No. Hei 9-114267, and paper type detection by utilizing regular reflection light and irregular reflection light disclosed in Japanese Published Unexamined Patent Application No. Hei 10-198093, and the like, are known.

Further, Japanese Published Unexamined Patent Application No. Hei 7-191510 proposes inputting paper type information by a user from an operation unit without a sensor for paper type (paper thickness) information. This user's inputting paper type information is employed in image forming apparatuses as a mainstream method. In the color copier of the present embodiment, basically the user inputs paper thickness information by operating the operation unit 300. Note that as the weight of paper is described on a print sheet package, it is easy for the user to specify the weight of paper via the printer driver or the operation unit 300. Accordingly, it is desirable to delete a sensor for detecting paper thickness, weight of paper or the like so as to reduce costs. However, paper type or weight of paper may be detected by such sensor.

The fixing control based on paper thickness is sufficiently effective for prevention of so-called high-temperature offset, i.e., a phenomenon that a toner image falls off a print sheet and becomes attached to a fixing roller.

Figure 18:
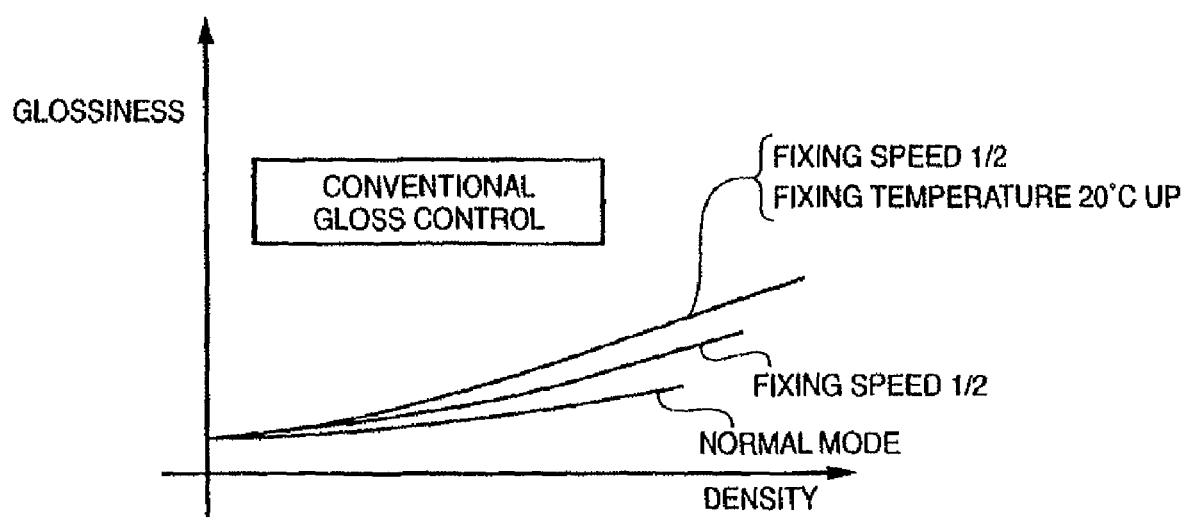
FIG. 18 is a graph showing glossiness to density.

On the other hand, Japanese Published Unexamined Patent Application No. Hei 9-160315 or the like discloses gloss control on a variable fixing speed, variable pressure, a variable oil coating amount and the like. However, as shown in FIG. 18, glossiness changes in accordance with density. In other words, in the case of electrophotography employing area tone representation (tone reproduction by density of each element), in control only on the fixer 50, the glossiness in a high-density sufficiently holding toner can be increased, however, the glossiness in high light to halftone areas is influenced by the gloss characteristic of a print sheet. A print sheet having a rough surface such as bond paper shows a glossiness characteristic as shown in FIG. 18. To avoid this glossiness characteristic, it is most efficient and effective to use a print sheet having a non-rough surface such as coat paper.

Figure 19:
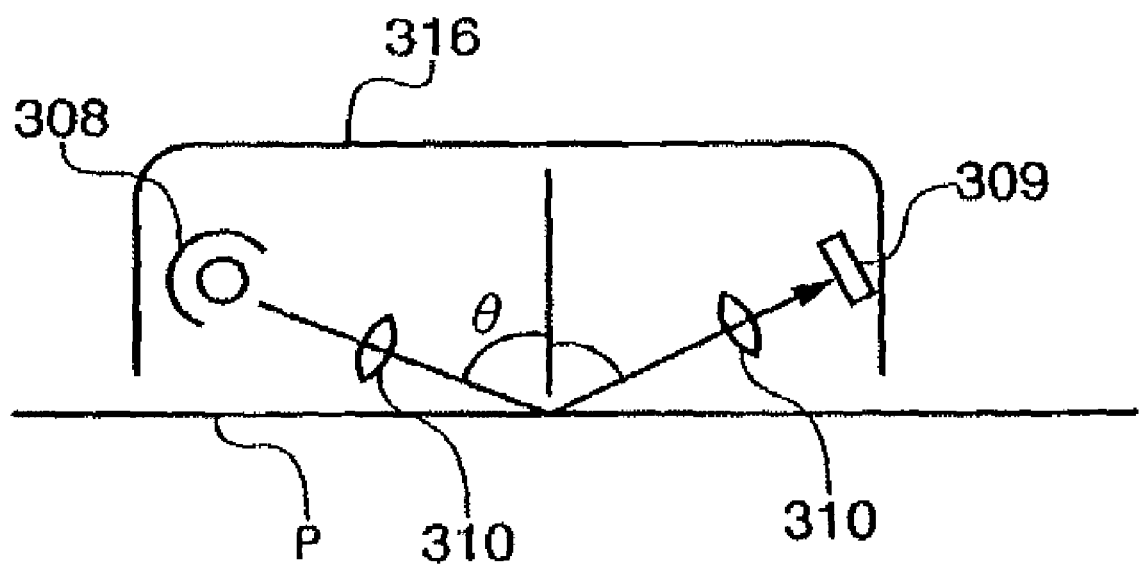
FIG. 19 is a schematic cross-sectional view of the construction of a glossiness sensor.

Accordingly, in the present embodiment, to determine whether or not a print sheet corresponding to the gloss mode is set in the paper cassette 61, a glossiness sensor 316 as shown in FIG. 19 is provided in the paper feed unit, such that the paper type detection unit 207 converts an output from the glossiness sensor 316 to information indicating glossiness and sends the information to the gloss condition comparison unit 206 for determining whether or not the gloss mode can be executed and further which paper cassette 61 is to be used.

[Paper Type Detection]

Figure 20:
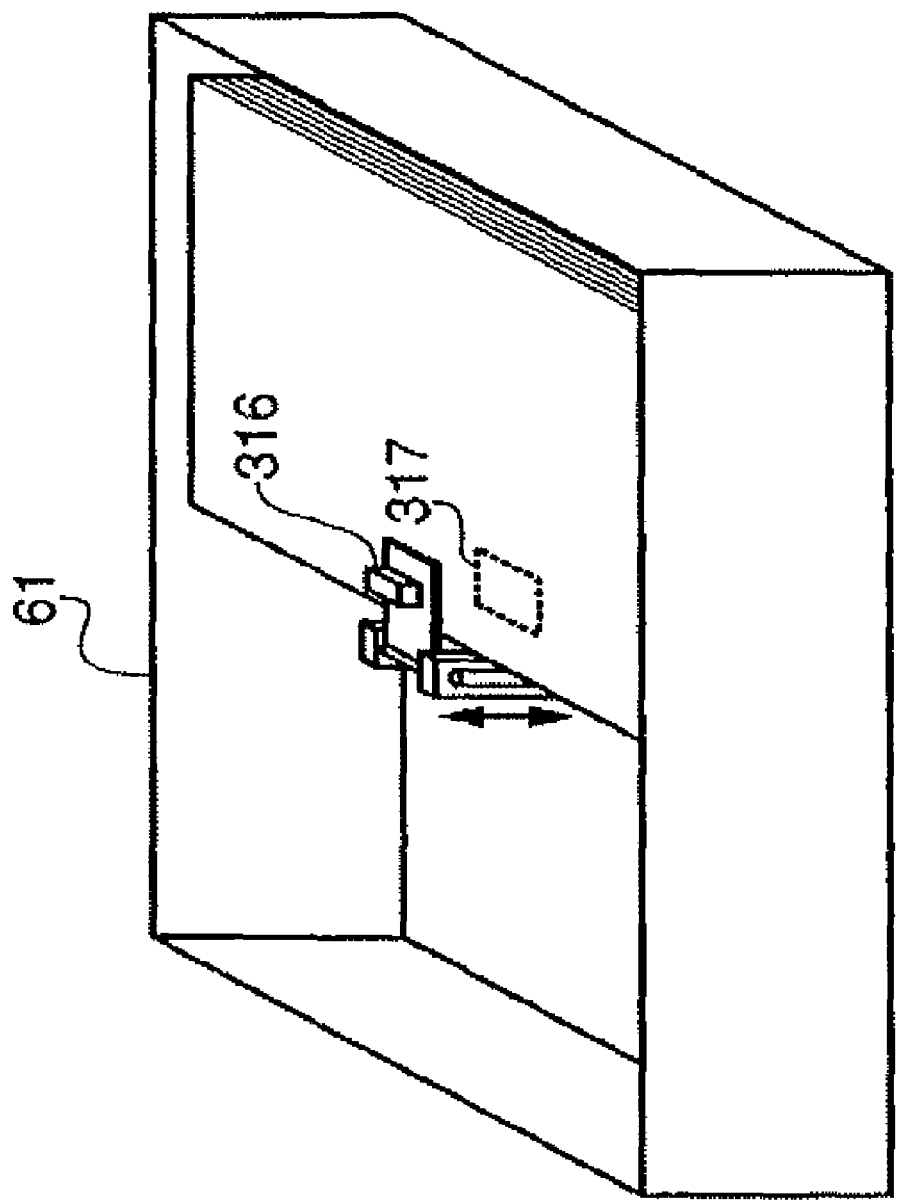
FIG. 20 is a perspective view explaining the arrangement of the glossiness sensor.

FIG. 20 is a perspective view explaining the arrangement of the glossiness sensor 316.

The glossiness sensor 316 and the paper type detection unit 207 measure glossiness by a method defined in JIS Z 8741. That is, a light beam with prescribed incident angle and prescribed approach angle is emitted on a print sheet set in the paper cassette 61, and the reflection light beam with a prescribed approach angle reflected in a mirror-surface reflection direction is measured by a light sensor.

In FIG. 19, a light beam emitted from a light source 308 passes through a lens 310, and enters a print sheet P at an angle v. Then the light beam reflected in a mirror-reflection direction passes through the lens 310, and enters a photo reception unit 309. Then the paper detection unit 207 obtains glossiness of the print sheet P from an output signal from the photoreception unit 309. The glossiness sensor 316 is provided in the respective paper cassettes 61, thereby glossiness of the surface of print sheet can be detected. Note that in the present embodiment, glossiness is detected with an incident angle v set to 60°.

As shown in FIG. 19, the glossiness sensor 316 is set to measure the surface of a top print sheet in the paper cassette 61 such that measurement can follow the change of the number of print sheets in the cassette. Further, for calibration of the glossiness sensor 61, a glass plate (calibration (CAL) plate) 317 with a refractive index of 1.567 is attached to the bottom surface of the paper cassette 61. The light beam is emitted on the surface of the glass plate and the amount of mirror-surface (regular) reflection light from the surface of the glass plate is used as a reference value (glossiness of 100). The calibration is performed when there is no print sheet in the paper cassette 61.

[Print Control]

Figure 21:
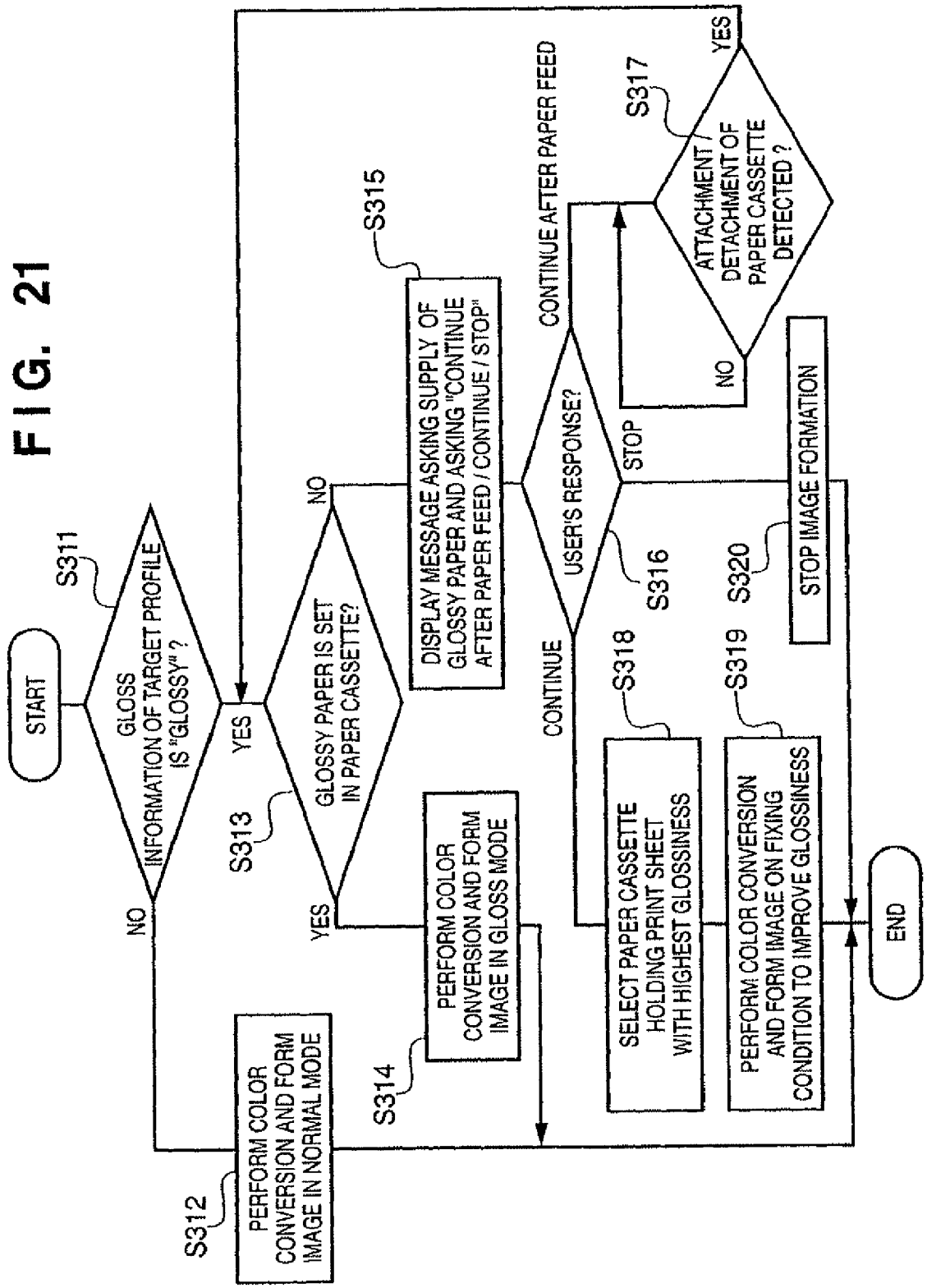
FIG. 21 is a flowchart showing printing in a gloss mode.

FIG. 21 is a flowchart showing print control by the CPU 210.

When printing is designated, the CPU 210 determines whether the description of gloss information in a target profile is "glossy" or "matte" (S311). If the gloss information is "matte", the CPU sets the image forming mode to the normal mode, causes the image processing unit to perform color conversion, and sends converted image signals to the printer unit 204 for image formation (S312).

On the other hand, if the gloss information is "glossy", the CPU determines whether or not glossy paper is set in the paper cassette 61 (S313). Note that if the output signal from the glossiness sensor 316 indicates glossiness of 30 or higher, it is determined that glossy paper is set in the paper cassette 61. The boundary between "gloss" and "matte" is not clear, and the glossiness also varies in accordance with incident/reflection angle of the glossmeter. The above threshold value "30" is set based on the result of measurement performed by the inventors on the glossiness of print sheet called coat paper by using the glossiness sensor 316.

If glossy paper is set in the paper cassette 61, the image forming mode is set to the gloss mode, then image processing unit is caused to perform color conversion for the gloss mode, and the converted image signals are sent to the printer unit 204 for image formation (S314).

On the other hand, if glossy paper is not set in the paper cassette 61, a message indicating that there is no glossy paper and requiring glossy paper, and a message asking "continue after paper feed/continue/stop" are displayed on the operation unit 300 (or transmitted to a computer device) (S315), and the user's response is waited (S316).

In a case where the user has selected "continue after paper feed" (S316), when the CPU 210 detects attachment/detachment of the paper cassette 61 or the like (S317), it determines that print sheets have been supplied, and returns the processing to step S13.

In a case where the user has selected "continue" (S316), the CPU 210 selects a paper cassette holding print sheets with highest glossiness (S318), causes the image processing unit to perform color conversion for the gloss mode, then sends the converted image signals to the printer unit 204, to cause the printer unit to form an image on a fixing condition to improve the glossiness to a higher level than a normal level (S319).

Further, if the user has selected "stop" (S316), the CPU 210 stops the image formation (S320).

[Fixing Control]

The fixing control is premised on the weight of paper designated from the operation unit 300 or the like. FIG. 22 is a table showing fixing speeds corresponding to weights of paper.

FIG. 23 is a table showing fixing control corresponding to modes.

[Selection of Gloss Mode]

The gloss mode may be selected in accordance with the following conditions as well as the user's selection.

"glossy" is described in a target profile there is no matte paper

On the condition "'glossy' is described in a target profile", it is determined whether or not image formation in the gloss mode is to be performed by referring to the attribute tag of the target profile. That is, if "glossy" is described in the attribute tag of the target profile, the gloss mode is set (the fixing condition upon image output, the paper type, a destination ICC profile are selected for the gloss mode), and an image is formed.

The condition "there is no matte paper" means a nonstandard status where no bond paper (matte paper) or the like exists. In this status, if an image is formed on glossy paper on a normal fixing condition, obtained is an unnatural output image where toner melt is poor, the base of the image has glossiness and the glossiness in a toner-attached portion is low. This image is especially inconvenient as a portrait since the glossiness is high in a low image rate portion such as a flesh color portion while the glossiness is low in a high image rate portion such as a portion of hair, cloth or the like. That is, such image has a very low image quality far from that of a photograph or printed matter. To avoid outputting this low quality image, image formation is performed in the gloss mode if there is only glossy paper.

In this manner, according to the present embodiment, a profile for color conversion can be downloaded, and it is determined whether or not the downloaded profile is a profile for gloss mode. Then registration (storage) of the downloaded profile is controlled in correspondence with the determination. Further, in a case where image formation in the gloss mode has been designated, it is determined whether or not there is glossy paper, and image formation is controlled in correspondence with the determination.

Further, in the gloss mode, the gloss condition of a target profile is referred to, and the gloss mode is set so as to obtain a gloss condition close to a target output environment. That is, gloss matching is possible.

Further, image formation in the gloss mode can be performed on the condition that "glossy" is described in the target profile, the condition that there is no matte paper, and the like.

Fourth Embodiment

Hereinbelow, the image processing according to a fourth embodiment of the present invention will be described. Note that in the fourth embodiment, constituent elements corresponding to those of the third embodiment have the same reference numerals and detailed explanations thereof will be omitted.

The fourth embodiment will be described as an example where an ICC profile having the private tag where information to realize more accurate gloss matching is described is installed in an image forming apparatus.

The ICC profile may include the public tag necessary for a general CMM for color matching, the optional public tag used for additional conversion and the private tag used in a custom CMM. The glossiness information can be included in the private tag. That is, as the glossiness information is described, in addition to the 2 standards, glossy/matte as gloss information in the attribute tag, an environment to provide an output image which is more faithful and which has glossiness desired by a user can be provided by using the glossiness information obtained by the paper type detection unit 207 and the glossiness information included in the private tag.

The glossiness information included in the private tag is as follows:

ave_G tag: average glossiness among C, M, Y, Bk, R, G, B, lowest brightness patch and W Sig_G table tag: signal sum (0 to 300%) to glossiness (0 to 100)

white_G tag: medium glossiness (glossiness of patch with respectively 0% image signals)

signal sum means the total sum of respective color component signals

In a case where the construction of the third embodiment where the attribute tag is referred to is changed to a construction where the white_-G tag in the above-described private tag is referred to, gloss matching having higher accuracy can be performed. Further, as a target profile and a destination profile are registered (stored) by glossiness of print sheet, the glossiness of print sheet can be selected with high accuracy, and more faithful gloss matching can be performed.

[Gloss Matching]

Figure 24:
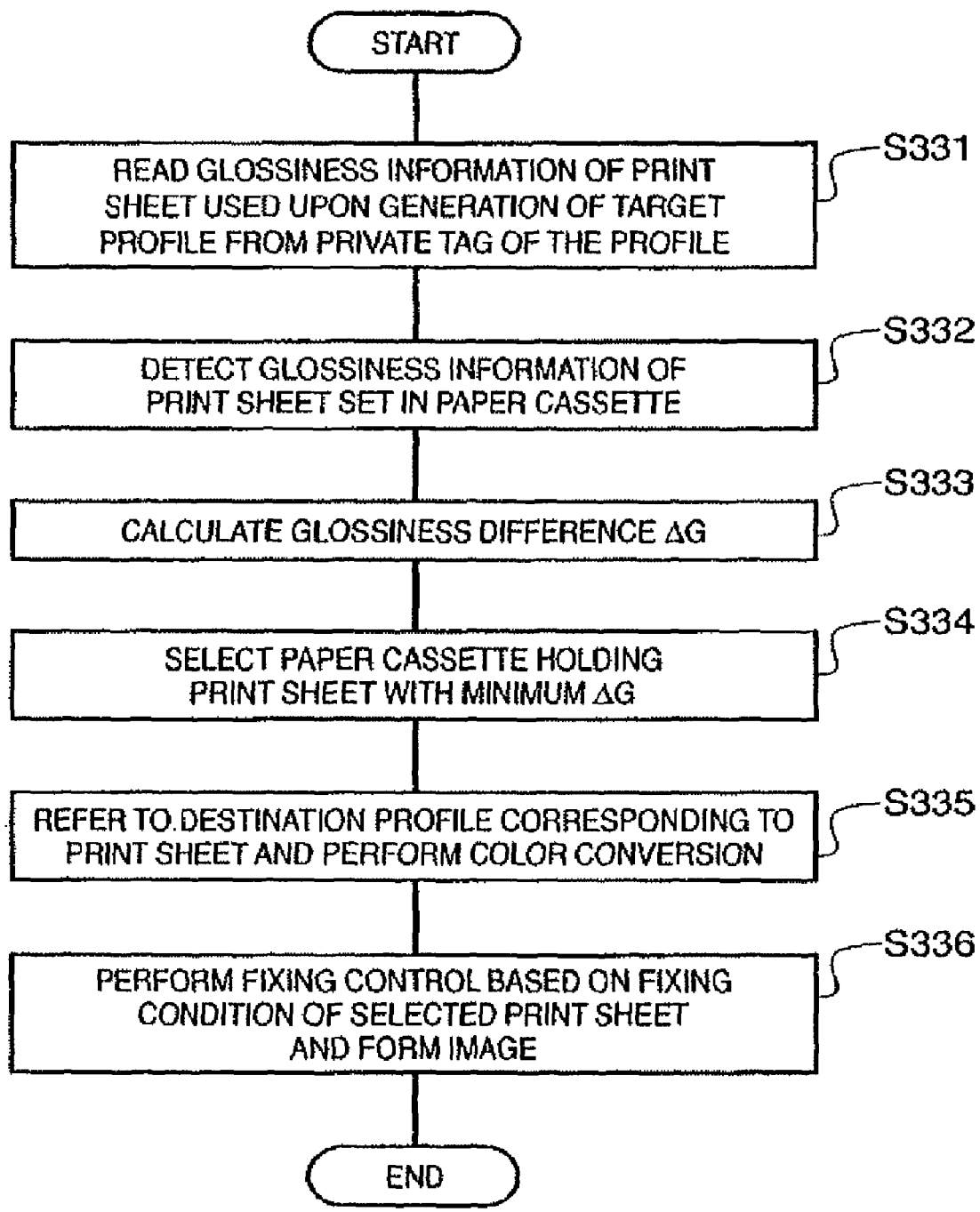
FIG. 24 is a flowchart showing gloss matching.

FIG. 24 is a flowchart showing the gloss matching executed by the CPU 210. Note that an example where representative CMYK data are inputted will be described.

First, glossiness information (White_G tag) of a print sheet used upon generation of a target profile designated by the user is read from the private tag of the target profile (S331), and the glossiness information of the print sheet set in the paper cassette 61 is detected (S332). Then, based on the glossiness information described in the profile and the detected glossiness information of the print sheet, the glossiness difference ΔG is calculated (S333), and a paper cassette 61 holding a print sheet having a minimum ΔG is selected (S334). Then, a destination profile corresponding to the print sheet is referred to and color conversion is performed (S335). Thereafter, fixing control is performed based on the fixing condition of the selected print sheet, and image formation is performed so as to obtain an output image having glossiness desired by the user (S336).

Note that it is desirable to understand the construction of the color copier of the present embodiment and set plural types of print sheets in the paper cassettes. Further, it may be arranged such that if the glossiness difference ΔG from the target is 20 or greater, an error message is displayed to ask the user's selection to supply of another print sheet, to continue the image formation or to stop the image formation, as in the case of the third embodiment.

<Modification>

In a case where the user wants glossiness at an appropriate level, the glossiness sensors 316 provided in correspondence with the respective paper cassettes 61 merely increase the cost of the apparatus. Accordingly, if it is arranged in the third embodiment such that the paper type detection unit 207 and the glossiness sensor 316 are deleted and the user selects "glossy paper" or "normal paper" when the user inputs the weight of paper, the cost can be reduced.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can also be achieved by providing a storage medium (or recording medium) holding software program code for performing the aforesaid processes to a system or an apparatus, reading the program code with a computer (e.g., CPU, MPU) of the system or apparatus from the storage medium, then executing the program.

In this case, the program code read from the storage medium realizes the functions according to the embodiments, and the storage medium holding the program code constitutes the invention.

Further, the storage medium, such as a floppy disk, a hard disk, an optical disk, a magneto-optical disk, a CD-ROM, a CD-R, a DVD, a magnetic tape, a non-volatile type memory card, and ROM can be used for providing the program code.

Furthermore, besides aforesaid functions according to the above embodiments being realized by executing program code which is read by a computer, the present invention includes a case where an OS (operating system) or the like working on the computer performs a part or entire actual processing in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. An image processing apparatus for performing color conversion based on a profile in which information on color conversion between device-dependent color space and device-independent color space is described, comprising:
   an acquisition section, arranged to acquire glossiness information described in the profile;
   a detector, arranged to detect the type of a print medium available for image formation; and
   a controller, arranged to determine a print medium and an image forming mode to be used in the image formation based on the glossiness information and the type of the print medium so as to control the image formation,
   wherein the controller selects a print medium having highest glossiness and controls the image formation on a fixing condition to improve glossiness if the glossiness information indicates a glossy attribute and the type of the print medium indicates non-glossy paper.

2. The image processing apparatus according to claim 1, wherein the controller sets a gloss mode as the image forming mode if the glossiness information indicates a glossy attribute and the type of the print medium indicates glossy paper.

3. An image processing apparatus for performing color conversion, comprising:
   an acquisition section, arranged to acquire target glossiness information described in a profile regarding color conversion from device-dependent color space to device-independent color space, and to acquire destination glossiness information described in a profile regarding color conversion from device-independent color space to the device-dependent color space; and
   a controller, arranged to determine a print medium and an image forming mode to be used in image formation based on the result of comparison between the target glossiness information and the destination glossiness information so as to control the image formation.

4. The apparatus according to claim 3, wherein the glossiness information is described in a private tag.

5. An image processing apparatus for performing color conversion based on a profile in which information on color conversion between device-dependent color space and device-independent color space is described, comprising:
   an acquisition section, arranged to acquire target glossiness information described in a profile regarding color conversion from the device-dependent color space to the device-independent color space;
   a detector, arranged to detect glossiness of a print medium available for image formation; and
   a controller, arranged to determine a print medium to be used in the image formation, an image forming mode and a destination profile based on the result of comparison between the target glossiness information and the glossiness of the print medium so as to control the image formation.

6. The apparatus according to claim 5, wherein the glossiness information is described in a private tag.

7. A method of controlling an image processing apparatus for performing color conversion based on a profile in which information on color conversion between device-dependent color space and device-independent color space is described, comprising:
   using a processor to perform the steps of:
   acquiring glossiness information described in the profile;
   detecting the type of a print medium available for image formation; and
   determining a print medium and an image forming mode to be used in the image formation based on the glossiness information and the type of the print medium so as to control the image formation,
   wherein, in the determining step, a print medium having highest glossiness and an image forming mode using a fixing condition to improve glossiness are selected if the glossiness information indicates a glossy attribute and the type of the print medium indicates non-glossy paper.

8. A method of controlling an image processing apparatus for performing color conversion, comprising:
   using a processor to perform the steps of:
   acquiring target glossiness information described in a profile regarding color conversion from device-dependent color space to device-independent color space, and acquiring destination glossiness information described in a profile regarding color conversion from the device-independent color space to the device-dependent color space; and
   determining a print medium and an image forming mode to be used in image formation based on the result of comparison between the target glossiness information and the destination glossiness information so as to control the image formation.

9. A method of controlling an image processing apparatus for performing color conversion based on a profile in which information on color conversion between device-dependent color space and device-independent color space is described, comprising:

using a processor to perform the steps of:
acquiring target glossiness information described in a profile regarding color conversion from the device-dependent color space to the device-independent color space;
detecting glossiness of a print medium available for image formation; and
determining a print medium to be used in the image formation, an image forming mode and a destination profile based on the result of comparison between the target glossiness information and the glossiness of the print medium so as to control the image formation.

10. A non-transitory computer-readable medium storing a computer-executable program for causing a computer to perform a method of controlling an image processing apparatus for performing color conversion based on a profile in which information on color conversion between device-dependent color space and device-independent color space is described, the method comprising the steps of:
acquiring glossiness information described in the profile;
detecting the type of a print medium available for image formation; and
determining a print medium and an image forming mode to be used in the image formation based on the glossiness information and the type of the print medium so as to control the image formation,
wherein, in the determining step, a print medium having highest glossiness and an image forming mode using a fixing condition to improve glossiness are selected if the glossiness information indicates a glossy attribute and the type of the print medium indicates non-glossy paper.

11. A non-transitory computer-readable medium storing a computer-executable program for causing a computer to perform a method of controlling an image processing apparatus for performing color conversion, the method comprising the steps of:
acquiring target glossiness information described in a profile regarding color conversion from device-dependent color space to device-independent color space, and acquiring destination glossiness information described in a profile regarding color conversion from the device-independent color space to the device-dependent color space; and
determining a print medium and an image forming mode to be used in image formation based on the result of comparison between the target glossiness information and the destination glossiness information so as to control the image formation.

12. A non-transitory computer-readable storage medium storing a computer-executable program for causing a computer to perform a method of controlling an image processing apparatus for performing color conversion based on a profile in which information on color conversion between device-dependent color space and device-independent color space is described, the method comprising the steps of:
acquiring target glossiness information described in a profile regarding color conversion from the device-dependent color space to the device-independent color space;
detecting glossiness of a print medium available for image formation; and
determining a print medium to be used for the image formation, an image forming mode and a destination profile based on the result of comparison between the target glossiness information and the glossiness of the print medium so as to control the image formation.

* * * * *